(12) United States Patent
Xia

(10) Patent No.: US 11,915,492 B2
(45) Date of Patent: Feb. 27, 2024

(54) TRAFFIC LIGHT RECOGNITION METHOD AND APPARATUS

(71) Applicant: Huawei Technologies Co., Ltd., Shenzhen (CN)

(72) Inventor: Han Xia, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 212 days.

(21) Appl. No.: 17/581,472

(22) Filed: Jan. 21, 2022

(65) Prior Publication Data

US 2022/0148318 A1    May 12, 2022

Related U.S. Application Data

(63) Continuation of application No. PCT/CN2020/103581, filed on Jul. 22, 2020.

(30) Foreign Application Priority Data

Jul. 22, 2019    (CN) .......................... 201910662904.3

(51) Int. Cl.
*G06V 20/58*    (2022.01)
*G06T 7/90*    (2017.01)
(Continued)

(52) U.S. Cl.
CPC .............. *G06V 20/584* (2022.01); *G06T 7/60* (2013.01); *G06T 7/70* (2017.01); *G06T 7/90* (2017.01);
(Continued)

(58) Field of Classification Search
CPC ...... G06V 20/584; G06V 10/74; G06V 10/82; G06T 7/60; G06T 7/70; G06T 7/90; G06T 2207/30252; G06F 18/22
See application file for complete search history.

(56) References Cited

U.S. PATENT DOCUMENTS 9,446,765 B2    9/2016  Shalom et al.
2018/0053059 A1  2/2018  Mei et al.
(Continued)

FOREIGN PATENT DOCUMENTS

CN    107506760 A    12/2017
CN    108804983 A    11/2018
(Continued)

OTHER PUBLICATIONS

Tristan Matthias Langenberg, "Deep Learning Metadata Fusion for Traffic Light to Lane Assignment", Ph.D dessertation (Year: 2019).*
(Continued)

*Primary Examiner* — Qian Yang
(74) *Attorney, Agent, or Firm* — Leydig, Voit & Mayer, Ltd.

(57) ABSTRACT

This application discloses a traffic light recognition method and apparatus in the field of artificial intelligence that relate to an automated driving technology. The recognition apparatus determines location information of n first traffic lights in a first image based on current positioning information of a vehicle, a calibration parameter of an image sensor, and prestored map data; and detects the first image by using an image detection method, to obtain location information of m second traffic lights in the first image and indication information of the m second traffic lights. This effectively reduces a traffic light recognition error, and improves recognition accuracy.

19 Claims, 10 Drawing Sheets

(51) Int. Cl.
  *G06T 7/70* (2017.01)
  *G06V 10/74* (2022.01)
  *G06V 10/82* (2022.01)
  *G06T 7/60* (2017.01)

(52) U.S. Cl.
  CPC .............. *G06V 10/74* (2022.01); *G06V 10/82* (2022.01); *G06T 2207/30252* (2013.01)

(56) References Cited

U.S. PATENT DOCUMENTS

| | | | |
|---|---|---|---|
| 2018/0218226 | A1 | 8/2018 | Wellington et al. |
| 2019/0080186 | A1* | 3/2019 | Zhai .................... G06V 20/584 |
| 2019/0195649 | A1 | 6/2019 | Chang et al. |
| 2020/0105009 | A1* | 4/2020 | Eno ........................... G06T 7/70 |

FOREIGN PATENT DOCUMENTS

| | | |
|---|---|---|
| CN | 109492507 A | 3/2019 |
| CN | 109767637 A | 5/2019 |
| CN | 109949594 A | 6/2019 |
| CN | 110543814 A | 12/2019 |

OTHER PUBLICATIONS

Zhou et al., "Real-Time Traffic Light Recognition Based On C-Hog Features", Computing and Informatics, vol. 36, 2017, 793-814 (Year: 2017).*

Yuan et al., "Traffic Lights Detection and Recognition Based on Color and Shape with SVM", 2016 International Conference on Computer, Mechatronics and Electronic Engineering (CMEE 2016) (Year: 2016).*

"IEEE Standard for Information technology—Telecommunications and information exchange between systems Local and metropolitan area networks—Specific requirements; Part 11: Wireless LAN Medium Access Control (MAC) and Physical Layer (PHY) Specifications," IEEE Std 802.11™—2016 (Revision of IEEE Std 802.11-2012), IEEE Standards Association, Total 3534 pages, Institute of Electrical and Electronics Engineers, New York, New York (Dec. 7, 2016).

* cited by examiner

TRAFFIC LIGHT RECOGNITION METHOD AND APPARATUS

CROSS-REFERENCE TO RELATED APPLICATIONS

This application is a continuation of International Application No. PCT/CN2020/103581, filed on Jul. 22, 2020, which claims priority to Chinese Patent Application No. 201910662904.3, filed on Jul. 22, 2019. The disclosures of the aforementioned applications are hereby incorporated by reference in their entireties.

TECHNICAL FIELD

This application relates to an automated driving technology in the field of artificial intelligence, and in particular, to a traffic light recognition method and apparatus.

BACKGROUND

In a driving process of a driverless vehicle, a color and a location of a traffic light usually need to be recognized (or a pointing direction of the traffic light may also need to be recognized), to control running of the driverless vehicle based on a recognition result.

According to an existing traffic light recognition method, location information of a traffic light group at a target intersection in a map is obtained based on positioning information of a vehicle, and coordinate transformation is performed on the location information of the traffic light group, to determine a region of interest that is in an image captured by a target camera of the vehicle and that includes the traffic light group. Subsequently, the region of interest is analyzed to obtain a light status of the traffic light group, and the map is queried based on the light status of the traffic light group to obtain indication information of a traffic light currently turned on. The indication information is used to indicate a traffic state at the target intersection.

However, in the method, an error may exist in a process of determining the region of interest based on the location information of the traffic light group. If the error is beyond expectation, a traffic light is likely to be mistakenly detected or missed. Consequently, a lane to which the traffic light belongs and a color of the traffic light may be incorrectly determined, leading to an inaccurate recognition result.

SUMMARY

This application provides a traffic light recognition method and apparatus, to resolve a problem of inaccurate traffic light recognition.

To achieve the foregoing objectives, the following technical solutions are used in this application.

According to a first aspect, a traffic light recognition method is provided. A traffic light recognition apparatus (recognition apparatus for short) obtains current positioning information of a vehicle and a first image currently obtained by using an image sensor; determines location information of n (n is an integer greater than or equal to 1) first traffic lights in the first image based on the current positioning information of the vehicle, a calibration parameter of the image sensor, and prestored map data; and detects the first image by using an image detection method, to obtain location information of m (m is an integer greater than or equal to 1) second traffic lights in the first image and indication information of the m second traffic lights. The indication information includes at least one of a color and semantic indication information. Then, the recognition apparatus determines, based on the location information of the n first traffic lights in the first image and the location information of the m second traffic lights in the first image and based on a preset error constraint, a first traffic light and a second traffic light that match each other; and obtains indication information of the second traffic light that matches the first traffic light.

In this application, a quantity of pairs of first traffic lights and second traffic lights that match each other is an integer less than or equal to min(m, n).

For ease of description, in this application, the location information of the second traffic lights in the first image and the indication information of the second traffic lights are referred to as an image detection result, and the location information of the first traffic lights in the first image is referred to as a map positioning result.

In a traffic light recognition process, the recognition apparatus comprehensively considers the image detection result and the map positioning result, thereby effectively preventing a traffic light from being mistakenly detected or missed. The recognition apparatus determines, based on the image detection result and the map positioning result and under a condition of the preset error constraint, the first traffic light and the second traffic light that match each other, and obtains the indication information of the second traffic light that matches the first traffic light. This effectively reduces a traffic light recognition error, and improves recognition accuracy.

Optionally, in a possible implementation of this application, a method for "the recognition apparatus determines, based on the location information of the n first traffic lights in the first image and the location information of the m second traffic lights in the first image and based on a preset error constraint, a first traffic light and a second traffic light that match each other" includes: The recognition apparatus performs the following step A, step B, and step C to determine whether a pair of subimages matching each other exists in a first subimage group and a second subimage group. If a pair of subimages matching each other exists, the recognition apparatus determines, based on the pair of subimages matching each other, the first traffic light and the second traffic light that match each other.

Specifically, step A is: The recognition apparatus selects i first traffic lights from the n first traffic lights, and generates the first subimage group, where the first subimage group includes k subimages, each subimage in the first subimage group includes a first location or a first location relationship, the first location is used to indicate locations, in the first image, of the i first traffic lights included in the subimage, the first location relationship is used to indicate a relationship between the locations, in the first image, of the i first traffic lights included in the subimage, $k=C_n^i$, and $1 \leq i \leq \min(n, m)$. Step B is: The recognition apparatus selects i second traffic lights from the m second traffic lights, and generates the second subimage group, where the second subimage group includes p subimages, each subimage in the second subimage group includes a second location or a second location relationship, the second location is used to indicate locations, in the first image, of the i second traffic lights included in the subimage, the second location relationship is used to indicate a relationship between the locations, in the first image, of the i second traffic lights included in the subimage, and $p=C_m^i$. Step C is: The recognition apparatus determines whether a pair of subimages matching each other exists in the first subimage group and the second subimage group, where an error between a first location and a second location respectively included in the pair of subimages matching each other is less than the preset error constraint, or an error between a first location relationship and a second location relationship respectively included in the pair of subimages matching each other is less than the preset error constraint.

A quantity of traffic lights included in each subimage in the first subimage group currently obtained by the recognition apparatus is the same as a quantity of traffic lights included in each subimage in the second subimage group currently obtained by the recognition apparatus. The recognition apparatus determines, by determining a pair of subimages matching each other, the first traffic light and the second traffic light that match each other.

The subimage in this application includes one or more traffic lights. If the subimage includes only one traffic light, the subimage is used to indicate a location of the traffic light in the first image. If the subimage includes a plurality of traffic lights, the subimage is used to indicate a location of each of the plurality of traffic lights in the first image and a relationship between the locations of the plurality of traffic lights in the first image.

In this application, if a subimage (for example, a subimage A) in the first subimage group and a subimage (for example, a subimage B) in the second subimage group match each other, the subimage A and the subimage B are referred to as a "pair of subimages matching each other". In other words, the "pair of subimages matching each other" include the subimage A and the subimage B.

Optionally, in another possible implementation of this application, a method for "the recognition apparatus determines, based on the pair of subimages matching each other, the first traffic light and the second traffic light that match each other" includes: The recognition apparatus selects, if at least two pairs of subimages matching each other exist, a pair of subimages matching each other from the at least two pairs of subimages matching each other, where the selected pair of subimages matching each other respectively include a first subimage in the first subimage group and a second subimage in the second subimage group; and the recognition apparatus determines that a $j^{th}$ first traffic light arranged in a preset order in the first subimage matches a $j^{th}$ second traffic light arranged in the preset order in the second subimage. If only one pair of subimages matching each other exists, and the pair of subimages matching each other respectively include a first subimage in the first subimage group and a second subimage in the second subimage group, the recognition apparatus determines that a $j^{th}$ first traffic light arranged in a preset order in the first subimage matches a $j^{th}$ second traffic light arranged in the preset order in the second subimage, where $j \in [1, i]$.

If a first subimage matches a second subimage, it indicates that an error between a location, in the first image, of a first traffic light in the first subimage and a location, in the first image, of a second traffic light in the second subimage is less than a preset error value, and a distance between traffic lights corresponding to each other in the first subimage and the second subimage is less than a preset distance. In this way, the recognition apparatus determines that the $j^{th}$ first traffic light arranged in the preset order in the first subimage matches the $j^{th}$ second traffic light arranged in the preset order in the second subimage. The preset order herein may be a spatial left-to-right order, or may be a spatial top-to-bottom order, or may be a spatial right-to-left order. This is not limited in this application.

Optionally, in another possible implementation of this application, if no pair of subimages matching each other exists in the first subimage group and the second subimage group, the recognition apparatus re-determines a value of i, and performs step A, step B, and step C based on the re-determined value of i.

The recognition apparatus may randomly determine the value of i, or may determine the value of i in descending order starting from a minimum value of n and m. This is not limited in this application. When the recognition apparatus determines the value of i in descending order starting from the minimum value of n and m, a traffic light can be effectively prevented from being mistakenly detected or missed. Compared with the manner in which the recognition apparatus randomly determines the value of i, this manner can further effectively improve traffic light recognition efficiency.

Optionally, in another possible implementation of this application, the error constraint in this application is a geometric error and a distance error. A method for "the recognition apparatus determines whether a pair of subimages matching each other exists in the first subimage group and the second subimage group" includes: The recognition apparatus calculates a geometric error (including at least one of a scale error and an angle error) and a distance error between a third subimage (any subimage in the first subimage group) and a fourth subimage (any subimage in the second subimage group). Subsequently, the recognition apparatus determines, by determining whether the geometric error meets a preset condition and whether the distance error is less than a preset distance, whether the third subimage and the fourth subimage match each other, that is, determines whether a pair of subimages matching each other exists in the first subimage group and the second subimage group. Specifically, if the geometric error meets the preset condition and the distance error is less than the preset distance, the third subimage and the fourth subimage match each other.

The scale error is used to represent a ratio of a first length to a second length, the first length is a length between a $i^{th}$ traffic light and a $(j+1)^{th}$ traffic light that are arranged in the preset order in the third subimage, and the second length is a length between a $j^{th}$ traffic light and a $(j+1)^{th}$ traffic light that are arranged in the preset order in the fourth subimage. The angle error is used to represent a difference between a first angle and a second angle, the first angle is an angle between a first connection line and a preset coordinate axis in a coordinate system of the first image, the second angle is an angle between a second connection line and the preset coordinate axis, the first connection line is a connection line between the $j^{th}$ traffic light and the $(j+1)^{th}$ traffic light that are arranged in the preset order in the third subimage, and the second connection line is a connection line between the $j^{th}$ traffic light and the $(j+1)^{th}$ traffic light that are arranged in the preset order in the fourth subimage. The distance error is used to indicate a distance between the $j^{th}$ traffic light arranged in the preset order in the third subimage and the $j^{th}$ traffic light arranged in the preset order in the fourth subimage, where $j \in [1, i]$.

Correspondingly, that the geometric error meets a preset condition includes: if the geometric error includes the scale error, the scale error is less than or equal to a first preset threshold; and if the geometric error includes the angle error, the angle error is less than or equal to a second preset threshold.

Optionally, in another possible implementation of this application, the geometric error in this application further includes a semantic error. The semantic error is used to indicate confidence of semantic information of the $j^{th}$ traffic light arranged in the preset order in the fourth subimage relative to semantic information of the $j^{th}$ traffic light arranged in the preset order in the third subimage.

Correspondingly, that the geometric error meets a preset condition further includes: the semantic error is less than or equal to a third preset threshold.

Optionally, in another possible implementation of this application, a method for "the recognition apparatus selects, if at least two pairs of subimages matching each other exist, a pair of subimages matching each other from the at least two pairs of subimages matching each other" includes: The recognition apparatus selects, from the at least two pairs of subimages matching each other, a pair of subimages having a minimum sum of a geometric error and a distance error. This effectively improves recognition accuracy.

Optionally, in another possible implementation of this application, a method for "the recognition apparatus detects the first image by using an image detection method, to obtain location information of m second traffic lights in the first image and indication information of the m second traffic lights" includes: The recognition apparatus detects the first image by using a preset neural network model, to obtain the location information of the m second traffic lights in the first image and the indication information of the m second traffic lights.

The recognition apparatus in this application may detect the first image by using a neural network model, or the recognition apparatus detects the first image by using an object recognition algorithm or another computer vision technology.

According to a second aspect, a recognition apparatus is provided. The recognition apparatus provided in this application includes a storage unit, an obtaining unit, a determining unit, an image detection unit, and a matching unit.

Specifically, the obtaining unit is configured to obtain current positioning information of a vehicle and a first image, where the first image is currently obtained by using an image sensor. The determining unit is configured to determine location information of n first traffic lights in the first image based on the current positioning information, obtained by the obtaining unit, of the vehicle, a calibration parameter of the image sensor, and map data prestored by the storage unit, where n is an integer greater than or equal to 1. The image detection unit is configured to detect, by using an image detection method, the first image obtained by the obtaining unit, to obtain location information of m second traffic lights in the first image and indication information of the m second traffic lights, where the indication information includes at least one of a color and semantic indication information, and m is an integer greater than or equal to 1. The matching unit is configured to determine, based on the location information, determined by the determining unit, of the n first traffic lights in the first image and the location information, obtained by the image detection unit, of the m second traffic lights in the first image and based on a preset error constraint, a first traffic light and a second traffic light that match each other. The obtaining unit is further configured to obtain indication information of the second traffic light that is determined by the matching unit and that matches the first traffic light.

Optionally, in a possible implementation of this application, the matching unit is specifically configured to: step A: select i first traffic lights from the n first traffic lights, and generate a first subimage group, where the first subimage group includes k subimages, each subimage in the first subimage group includes a first location or a first location relationship, the first location is used to indicate locations, in the first image, of the i first traffic lights included in the subimage, the first location relationship is used to indicate a relationship between the locations, in the first image, of the i first traffic lights included in the subimage, $k=C_n^i$, and $1 \le i \le \min(n, m)$; step B: select i second traffic lights from the m second traffic lights, and generate a second subimage group, where the second subimage group includes p subimages, each subimage in the second subimage group includes a second location or a second location relationship, the second location is used to indicate locations, in the first image, of the i second traffic lights included in the subimage, the second location relationship is used to indicate a relationship between the locations, in the first image, of the i second traffic lights included in the subimage, and $p=C_m^i$; step C: determine whether a pair of subimages matching each other exists in the first subimage group and the second subimage group, where an error between a first location and a second location respectively included in the pair of subimages matching each other is less than the error constraint, or an error between a first location relationship and a second location relationship respectively included in the pair of subimages matching each other is less than the preset error constraint; and if a pair of subimages matching each other exists, determine, based on the pair of subimages matching each other, the first traffic light and the second traffic light that match each other.

Optionally, in another possible implementation of this application, the matching unit is specifically configured to: select, if at least two pairs of subimages matching each other exist, a pair of subimages matching each other from the at least two pairs of subimages matching each other, where the selected pair of subimages matching each other respectively include a first subimage in the first subimage group and a second subimage in the second subimage group; and determine that a $j^{th}$ first traffic light arranged in a preset order in the first subimage matches a $j^{th}$ second traffic light arranged in the preset order in the second subimage; and if only one pair of subimages matching each other exists, and the pair of subimages matching each other respectively include a first subimage in the first subimage group and a second subimage in the second subimage group, determine that a $j^{th}$ first traffic light arranged in a preset order in the first subimage matches a $j^{th}$ second traffic light arranged in the preset order in the second subimage, where $j \in [1, i]$.

Optionally, in another possible implementation of this application, the determining unit is further configured to: if the matching unit determines that no pair of subimages matching each other exists, re-determine a value of i. The matching unit is further configured to perform step A, step B, and step C based on the value, re-determined by the determining unit, of i.

Optionally, in another possible implementation of this application, the error constraint is a geometric error and a distance error. Correspondingly, the matching unit is specifically configured to: calculate a geometric error and a distance error between a third subimage and a fourth subimage, where the third subimage is any subimage in the first subimage group, and the fourth subimage is any subimage in the second subimage group; and if the geometric error meets a preset condition and the distance error is less than a preset distance, determine that the third subimage and the fourth subimage match each other, where the geometric error includes at least one of a scale error or an angle error.

The scale error is used to represent a ratio of a first length to a second length, the first length is a length between a $j^{th}$ traffic light and a $(j+1)^{th}$ traffic light that are arranged in the preset order in the third subimage, and the second length is a length between a $j^{th}$ traffic light and a $(j+1)^{th}$ traffic light that are arranged in the preset order in the fourth subimage. The angle error is used to represent a difference between a first angle and a second angle, the first angle is an angle between a first connection line and a preset coordinate axis in a coordinate system of the first image, the second angle is an angle between a second connection line and the preset coordinate axis, the first connection line is a connection line between the $j^{th}$ traffic light and the $(j+1)^{th}$ traffic light that are arranged in the preset order in the third subimage, and the second connection line is a connection line between the $j^{th}$ traffic light and the $(j+1)^{th}$ traffic light that are arranged in the preset order in the fourth subimage, where $j \in [1, i]$. The distance error is used to indicate a distance between the $j^{th}$ traffic light arranged in the preset order in the third subimage and the $j^{th}$ traffic light arranged in the preset order in the fourth subimage. That the geometric error meets a preset condition includes: if the geometric error includes the scale error, the scale error is less than or equal to a first preset threshold; and if the geometric error includes the angle error, the angle error is less than or equal to a second preset threshold.

Optionally, in another possible implementation of this application, the geometric error further includes a semantic error. The semantic error is used to indicate confidence of semantic information of the $j^{th}$ traffic light arranged in the preset order in the fourth subimage relative to semantic information of the $j^{th}$ traffic light arranged in the preset order in the third subimage. That the geometric error meets a preset condition further includes: the semantic error is less than or equal to a third preset threshold.

Optionally, in another possible implementation of this application, the matching unit is specifically configured to: if the at least two pairs of subimages matching each other exist, select, from the at least two pairs of subimages matching each other, a pair of subimages having a minimum sum of a geometric error and a distance error.

Optionally, in another possible implementation of this application, the image detection unit is specifically configured to detect the first image by using a preset neural network model, to obtain the location information of the m second traffic lights in the first image and the indication information of the m second traffic lights.

According to a third aspect, a traffic light recognition apparatus is provided. The recognition apparatus includes one or more processors and a memory. The memory is coupled to the one or more processors. The memory is configured to store computer program code, the computer program code includes instructions, and when the one or more processors execute the instructions, the recognition apparatus performs the traffic light recognition method according to any one of the first aspect and the possible implementations of the first aspect.

According to a fourth aspect, a computer program product including instructions is provided. The computer program product includes instructions. When a processor of the recognition apparatus according to the third aspect executes the instructions, the recognition apparatus is enabled to perform the traffic light recognition method according to any one of the first aspect and the possible implementations of the first aspect.

According to a fifth aspect, a computer-readable storage medium is provided. The computer-readable storage medium includes instructions. When a processor of the recognition apparatus according to the third aspect executes the instructions, the recognition apparatus is enabled to perform the traffic light recognition method according to any one of the first aspect and the possible implementations of the first aspect.

According to a sixth aspect, a vehicle is provided. The vehicle includes the recognition apparatus according to the third aspect.

Optionally, after the recognition apparatus obtains indication information of a second traffic light that matches a first traffic light, the vehicle controls running of the vehicle based on the indication information.

The vehicle in this application may be a car, a truck, a motorcycle, a bus, a boat, an airplane, a helicopter, a lawn mower, a recreational vehicle, a playground vehicle, construction equipment, a tram, a golf cart, a train, a trolley, or the like.

In this application, a name of the recognition apparatus does not constitute any limitation to devices or functional modules. During actual implementation, these devices or the functional modules may have other names. Each device or functional module falls within the scope defined by the claims and their equivalent technologies in this application, provided that a function of the device or functional module is similar to that described in this application.

For detailed descriptions of the second aspect to the fifth aspect and various implementations thereof in this application, refer to detailed descriptions of the first aspect and the various implementations thereof. In addition, for beneficial effects of the second aspect to the fifth aspect and the various implementations thereof, refer to the analysis of beneficial effects of the first aspect and the various implementations thereof. Details are not described herein again.

These aspects or other aspects in this application are more concise and comprehensible in the following descriptions.

DESCRIPTION OF EMBODIMENTS

Figure 1A:
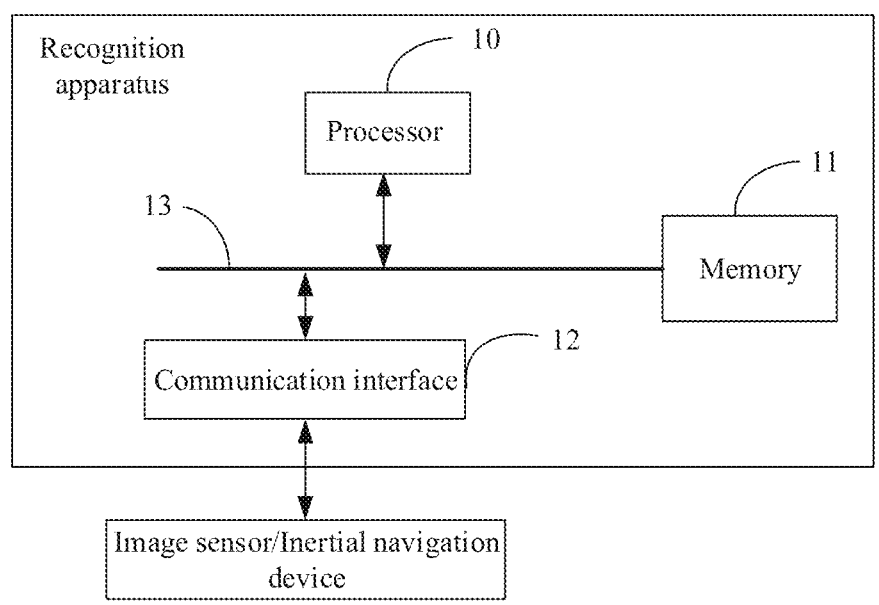
FIG. 1A is a schematic diagram of a hardware structure of a recognition apparatus according to an embodiment of this application.

In the specification, claims, and accompanying drawings of embodiments of this application, the terms "first", "second", "third", "fourth" and the like are intended to distinguish between different objects but do not indicate a particular order.

In the embodiments of this application, the word "example" or "for example" is used to represent giving an example, an illustration, or a description. Any embodiment or design scheme described as an "example" or "for example" in the embodiments of this application shall not be explained as being more preferred or having more advantages than another embodiment or design scheme. Specifically, use of the word "example", "for example", or the like is intended to present a related concept in a specific manner.

Artificial intelligence (AI) is a theory, a method, a technology, or an application system that simulates, extends, and expands human intelligence by using a digital computer or a machine controlled by a digital computer, to sense an environment, obtain knowledge, and achieve an optimal result by using the knowledge. In other words, artificial intelligence is a branch of computer science that attempts to understand the essence of intelligence and produce a new type of intelligent machine that can react in a manner similar to human intelligence. Artificial intelligence is to study design principles and implementation methods of various intelligent machines, so that the machines have functions of perception, reasoning, and decision-making. Research in the field of artificial intelligence includes robotics, natural language processing, computer vision, decision-making and reasoning, man-machine interaction, recommendation and search, AI basic theories, and the like.

Unmanned driving is a mainstream application in the field of artificial intelligence. An unmanned driving technology relies on collaboration among computer vision, radar, a monitoring apparatus, a global positioning system, and the like, so that a motor vehicle can implement automated driving without human intervention.

Generally, a driverless vehicle needs to sense an environment by using a sensor such as a camera or a lidar. In a driving process, the driverless vehicle needs to recognize whether a traffic light exists in front, and obtain traffic signal information after recognizing the traffic light, to control the driverless vehicle based on the traffic signal information.

In conventional technologies, there are many traffic light recognition methods. For example, at least one image of a region in front of a vehicle is obtained by using a camera, and target detection is performed on the obtained image, to control running of the vehicle based on a detection result. However, in the method, a traffic light is likely to be mistakenly detected or missed, and it is difficult to detect a lane to which a traffic light belongs, leading to an inaccurate recognition result. In another example, location information of a traffic light group at a target intersection in a map is obtained based on positioning information of a vehicle, and coordinate transformation is performed on the location information of the traffic light group, to determine a region of interest that is in an image captured by a target camera of the vehicle and that includes the traffic light group. Subsequently, the region of interest is analyzed to obtain a light status of the traffic light group, and the map is queried based on the light status of the traffic light group to obtain indication information of a traffic light currently turned on. The indication information is used to indicate a traffic state at the target intersection. However, in the method, an error may exist in a process of determining the region of interest based on the location information of the traffic light group. If the error is beyond expectation, a traffic light is likely to be mistakenly detected or missed. Consequently, a lane to which the traffic light belongs and a color of the traffic light may be incorrectly determined, leading to an inaccurate recognition result.

Therefore, embodiments of this application provide a traffic light recognition method and apparatus. Specifically, the recognition apparatus obtains and detects an image obtained by an image sensor, to obtain location information of a second traffic light in the image and indication information of the second traffic light (an image detection result for short). The recognition apparatus further obtains location information of a first traffic light in the image (a map positioning result for short) based on positioning information of a vehicle, a calibration parameter of the image sensor, and prestored map data. Then, the recognition apparatus determines, based on a preset error constraint, a first traffic light and a second traffic light that match each other, and obtains indication information of the second traffic light that matches the first traffic light. This effectively reduces a traffic light recognition error, and improves recognition accuracy.

The indication information of the traffic light includes at least one of a color and semantic indication information. The semantic indication information may be a pointing direction, a speed limit value, or the like.

For example, the recognition apparatus detects the obtained image, and obtains a color of a traffic light B at a location A that is red, and a pointing direction that is used to indicate the vehicle to turn left.

The first traffic light and the second traffic light in the embodiments of this application are merely used to distinguish traffic lights that are obtained by the recognition apparatus by using different methods, rather than limit traffic lights.

It should be noted that, the traffic light described in the embodiments of this application may be a conventional traffic light, or may be a traffic sign with variable display content, for example, an indicator light/a sign of a tidal lane, or a speed limit sign with a speed limit requirement varying with a change of traffic.

For ease of understanding, subsequent traffic lights are mainly described by using the conventional traffic light as an example.

The recognition apparatus is a device that is in a vehicle and that is configured to recognize a traffic light, and the device may be a vehicle-mounted device, or may be a chip in the vehicle-mounted device.

Generally, the recognition apparatus establishes wired communication connections or wireless communication connections to an image sensor, an inertial navigation device, a lidar, a camera, and other instruments in the vehicle to obtain an image captured by the image sensor, positioning information, measured by the inertial navigation device, of the vehicle, location information, measured by the lidar, of a traffic light, and the like.

For ease of understanding, a structure of the recognition apparatus in the embodiments of this application is described herein.

In an example, FIG. 1A is a schematic diagram of a hardware structure of a recognition apparatus according to an embodiment of this application. As shown in FIG. 1A, the recognition apparatus may include a processor 10, a memory 11, and a communication interface 12. The processor 10, the memory 11, and the communication interface 12 are connected by using a communication bus 13. The communication interface 12 may be further connected to an image sensor, an inertial navigation device, and the like in a vehicle.

The processor 10 may include one or more processing units. For example, the processor 10 may include an application processor (AP), an application-specific integrated circuit (ASIC), a graphics processing unit (GPU), an image signal processor (ISP), a controller, a video codec, a digital signal processor (DSP), a neural-network processing unit (NPU), and/or the like. Different processing units may be independent components, or may be integrated into one or more processors.

The processor 10 may be a nerve center and a command center of the recognition apparatus. The processor 10 may generate an operation control signal based on instruction operation code and a time sequence signal to complete control of instruction fetching and instruction execution.

For example, the processor 10 may be configured to: collect a digital image signal sent by the image sensor, and detect the collected image data, to determine location information of a second traffic light in the image and indication information (including at least one of a color and semantic indication information) of the second traffic light; determine location information of a first traffic light in the image by using positioning information, detected by the inertial navigation device, the lidar, or the like, of the vehicle; adjust parameters of the image sensor based on user setting to achieve an image effect required by an algorithm or a customer, for example, adjust parameters such as exposure time and a gain of the image sensor; select correct image processing parameters for images captured under different environmental conditions, to ensure image quality and provide a guarantee for an object recognition system; and crop an original image input by the image sensor to output an image resolution required by another user.

In an embodiment, a memory may be further disposed in the processor 10, to store instructions and data.

In a possible implementation, the memory in the processor 10 is a cache. The memory may store instructions or data used or cyclically used by the processor 10. If the processor 10 needs to use the instructions or the data again, the processor 10 may directly invoke the instructions or the data from the memory. This avoids repeated access and reduces waiting time of the processor 10, thereby improving system efficiency.

In an embodiment, the processor 10 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, an Ethernet interface, a universal serial bus (USB) interface, and/or the like.

The memory 11 may be configured to store computer-executable program code, where the executable program code includes instructions. The processor 10 runs the instructions stored in the memory 11, to execute various function applications and data processing of the recognition apparatus. For example, in this embodiment of this application, the processor 10 may run instructions stored in the memory 11, to determine location information of n first traffic lights in a first image (an image obtained by the image sensor) based on current positioning information of the vehicle, a calibration parameter of the image sensor, and prestored map data.

The memory 11 may include a program storage area and a data storage area. The program storage area may store an operating system, an application required by at least one function (for example, a function for determining whether traffic lights match), and the like. The data storage area may store data (for example, the location information of the n first traffic lights in the first image, location information of m second traffic lights in the first image, and indication information of the m second traffic lights) created and generated in a process of using the recognition apparatus, and the like.

In addition, the memory 11 may include a high-speed random access memory, and may further include a nonvolatile memory such as at least one disk storage device, a flash memory, or a universal flash storage (UFS).

The communication interface 12 is configured to connect to another device. For example, the processor 10 obtains, by using the communication interface 12, the first image obtained by the image sensor. Optionally, the communication interface 12 is configured to receive a configuration parameter (for example, the calibration parameter of the image sensor) for system operation, and transfer the configuration parameter to the processor 10. The communication interface 12 may be further configured to connect to an external device such as a target object detector or a radar, to ensure system scalability.

In this embodiment of this application, the communication bus 13 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 1A, but this does not mean that there is only one bus or only one type of bus.

It should be noted that a structure of the device shown in FIG. 1A does not constitute a limitation on the recognition apparatus. In addition to the components shown in FIG. 1A, the recognition apparatus may include more or fewer components than those shown in the figure, or combine some components, or have different component arrangements.

The vehicle described in the embodiments of this application includes the foregoing recognition apparatus. The vehicle may be a driverless car, or may be a conventional car that needs to be driven by a driver, which may be specifically equipped with a lidar, an image sensor, an inertial navigation device, a camera, and other instruments.

Regardless of whether the vehicle in the embodiments of this application needs to be driven by a driver, the vehicle may have a plurality of forms. For example, the vehicle in the embodiments of this application may be a car, a truck, a motorcycle, a bus, a boat, an airplane, a helicopter, a lawn mower, a recreational vehicle, a playground vehicle, construction equipment, a tram, a golf cart, a train, a trolley, or the like.

If the vehicle is a driverless car, after a traffic light is recognized by using the traffic light recognition method provided in the embodiments of this application, the driverless car controls running of the vehicle based on a recognition result. If the vehicle is a car driven by a driver, the car may recognize a traffic light by using the traffic light recognition method provided in the embodiments of this application, and a recognition result assists the driver in driving.

Figure 1B:
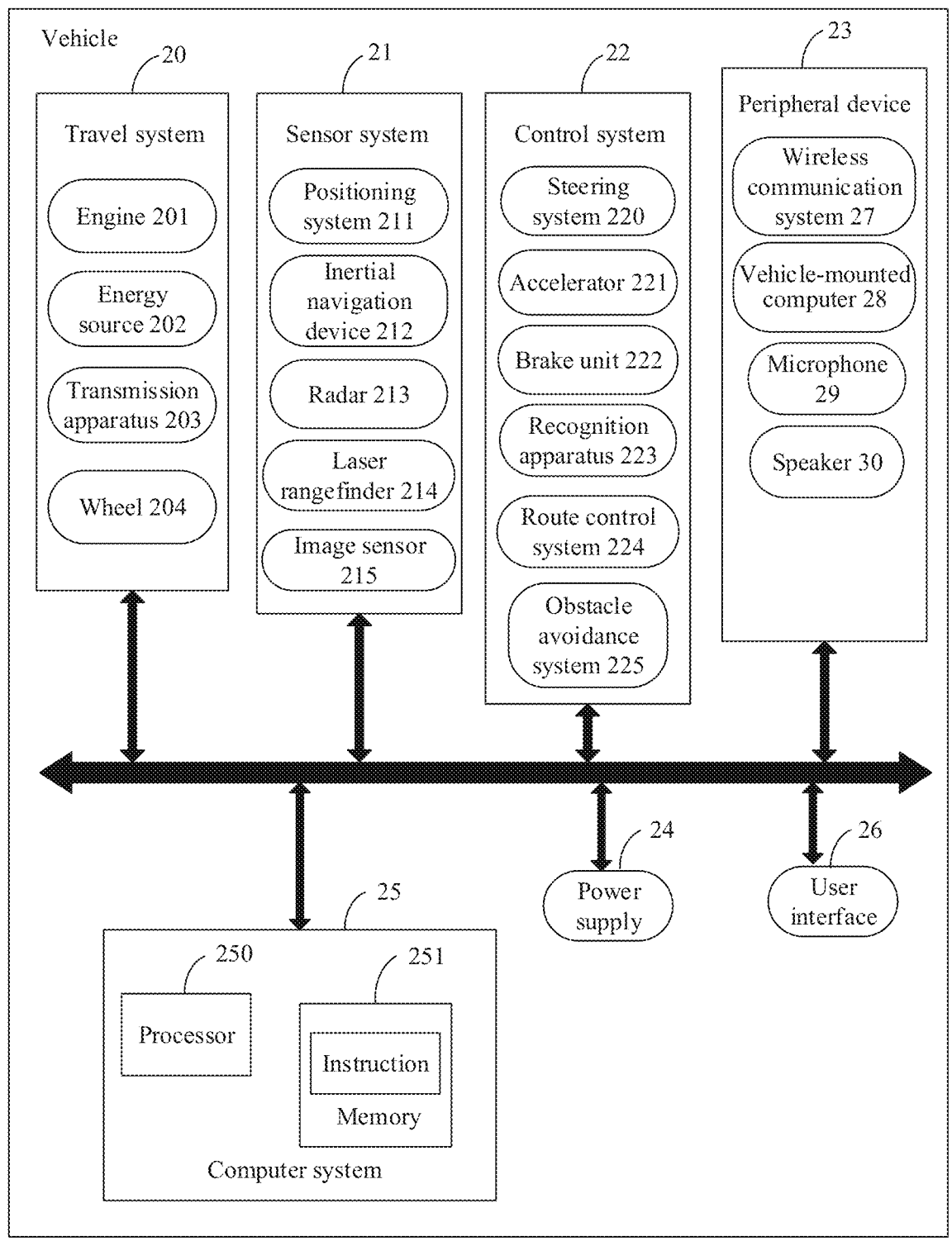
FIG. 1B is a schematic diagram of a hardware structure of a vehicle according to an embodiment of this application.

FIG. 1B is a function block diagram of a vehicle according to an embodiment of this application. As shown in FIG. 1B, the vehicle may include a travel system 20, a sensor system 21, a control system 22, one or more peripheral devices 23, a power supply 24, a computer system 25, and a user interface 26.

Optionally, the vehicle may include more or fewer subsystems, and each subsystem may include a plurality of components. In addition, each subsystem and element of the vehicle may be interconnected in a wired or wireless manner.

The travel system 20 may include a component that provides power for the vehicle to move. In an embodiment, the travel system 20 may include an engine 201, an energy source 202, a transmission apparatus 203, and a wheel/tire 204.

The engine 201 may be an internal combustion engine, an electric motor, an air compression engine, or a combination of other types of engines, for example, a hybrid engine including a gasoline engine and an electric motor, or a hybrid engine including an internal combustion engine and an air compression engine. The engine 201 converts the energy source 202 into mechanical energy.

The energy source 202 may include gasoline, diesel, another petroleum-based fuel, propane, another compressed gas-based fuel, ethanol, a solar panel, a battery, and another power source. The energy source 202 may also provide energy for another system of the vehicle.

The transmission apparatus 203 may transmit mechanical power from the engine 201 to the wheel 204. The transmission apparatus 203 may include a gearbox, a differential gear, and a drive shaft. In an embodiment, the transmission apparatus 203 may further include another device, such as a clutch. The drive shaft may include one or more shafts that may be coupled to one or more wheels 204.

The sensor system 21 may include several sensors configured to sense and detect surrounding environment information of the vehicle. For example, the sensor system 21 may include a positioning system 211 (the positioning system may be a global positioning system (GPS) system, or may be a BeiDou system or another positioning system), an inertial navigation device (for example, an inertial measurement unit (IMU)) 212, a radar 213, a laser rangefinder 214, and an image sensor 215. The sensor system 21 may further include sensors for monitoring an internal system of the vehicle, for example, an in-vehicle air quality monitor, a fuel gauge, and an oil temperature gauge.

Sensor data in the sensor system 21 may be used to detect an object and corresponding characteristics (a location, a shape, a direction, a speed, and the like) of the object. Such detection and recognition are key functions of security operations of the vehicle.

The positioning system 211 may be configured to estimate a geographical location of the vehicle.

The inertial navigation device 212 is configured to sense location and orientation changes of the vehicle based on an inertial acceleration. In an embodiment, the inertial navigation device 212 may be a combination of an accelerometer and a gyroscope.

The radar 213 may use a radio signal to sense an object in a surrounding environment of the vehicle. In some embodiments, in addition to sensing the object, the radar 213 may be further configured to sense a speed and/or a forward direction of the object.

The laser rangefinder 214 may use a laser to sense an object in an environment in which the vehicle is located. In some embodiments, the laser rangefinder 214 may include one or more laser sources, a laser scanner, one or more detectors, and another system component.

The image sensor 215 may be configured to capture a plurality of images of a surrounding environment of the vehicle. Generally, the image sensor is in a one-to-one correspondence with a camera.

An optical image of an object is generated through the camera, and projected to the image sensor 215. The image sensor 215 may be a charge coupled device (CCD) or a complementary metal-oxide-semiconductor (CMOS) phototransistor. The image sensor 215 converts an optical signal into an electrical signal, and then transmits the electrical signal to the ISP to convert the electrical signal into a digital image signal. The ISP outputs the digital image signal to the DSP for processing. The DSP converts the digital image signal into an image signal in a standard format such as an RGB format or a YUV format.

In some embodiments, the vehicle may include one or more cameras. Generally, the camera is in a one-to-one correspondence with the image sensor. For example, in this embodiment of this application, if the vehicle includes N (N is an integer greater than or equal to 1) cameras, the vehicle includes N image sensors.

The cameras are disposed/distributed in the vehicle depending on an actual situation. For example, a camera may be installed at a middle location of an upper edge of a windshield of the vehicle, or cameras may be installed on front, back, left, and right sides and the like of the vehicle. This is not specifically limited in this embodiment of this application.

If the vehicle includes a plurality of cameras, one or more of parameters such as installation locations, installation angles, and focal lengths of the plurality of cameras may be set to different values, to capture images of traffic lights within different distance ranges, thereby effectively expanding a traffic light recognition range, and improving recognition accuracy.

All or some components such as the image sensor 215, the inertial navigation device 212, the laser rangefinder 214, and other instruments in the sensor system 21 may be kept in an on state to improve traffic light recognition accuracy. Certainly, for energy saving, all or some components in the sensor system 21 may alternatively be in an on state periodically. This is not limited in this embodiment of this application.

The control system 22 controls operations of the vehicle and the components of the vehicle. The control system 22 may include various elements, such as a steering system 220, an accelerator 221, a brake unit 222, a recognition apparatus 223, a route control system 224, and an obstacle avoidance system 225.

The steering system 220 may be operated to adjust a forward direction of the vehicle. For example, in an embodiment, the steering system 220 may be a steering wheel system.

The accelerator 221 is configured to control an operating speed of the engine 201 and further control a speed of the vehicle.

The brake unit 222 is configured to control the vehicle to decelerate. The brake unit 222 may use friction to slow down the rotation of the wheel 204. In another embodiment, the brake unit 222 may convert kinetic energy of the wheel 204 into an electric current. Alternatively, the brake unit 222 may slow down the rotation of the wheel 204 in another manner to control the speed of the vehicle.

For a structure of the recognition apparatus 223, refer to the description of FIG. 1A.

The recognition apparatus 223 may perform image detection on the image obtained by the image sensor 215, to recognize an object and/or a feature in the surrounding environment of the vehicle. The object and/or the feature may include a traffic light (or a traffic signal), a road boundary, and an obstacle. The recognition apparatus 223 may perform image detection by using a neural network model, an object recognition algorithm, a structure from motion (SFM) algorithm, video tracking, or other computer vision technologies.

In addition, the recognition apparatus 223 may obtain location information, measured by the inertial navigation device 212, of the vehicle and the calibration parameter of the image sensor 215, and determine, based on the location information of the vehicle, the calibration parameter of the image sensor 215, and prestored map data, location information of a first traffic light in the image obtained by the image sensor 215.

Further, the recognition apparatus 223 further determines, based on a preset error constraint and based on a map positioning result (refer to the foregoing description) and an image detection result (refer to the foregoing description), a first traffic light and a second traffic light that match each other, and further obtains indication information of the second traffic light that matches the first traffic light, that is, determines a traffic light recognition result.

The route control system 224 is configured to determine a travel route of the vehicle. In some embodiments, the route control system 224 may determine a driving route for the vehicle with reference to data from the image sensor 215, the positioning system 211, and one or more predetermined maps.

The obstacle avoidance system 225 is configured to recognize, evaluate, and avoid or cross a potential obstacle in the environment of the vehicle.

Certainly, for example, the control system 22 may add or alternatively include components in addition to those shown and described. Alternatively, some of the components shown above may be reduced.

The vehicle interacts with an external sensor, another vehicle, another computer system, or a user through the peripheral device 23. The peripheral device 23 may include a wireless communication system 27, an vehicle-mounted computer 28, a microphone 29, and/or a speaker 30.

In some embodiments, the peripheral device 23 provides a means for a user of the vehicle to interact with the user interface 26. For example, the vehicle-mounted computer 28 may provide information for the user of the vehicle. The user interface 26 may further receive a user input by operating the vehicle-mounted computer 28. The vehicle-mounted computer 28 may be operated by using a touchscreen. In another case, the peripheral device 23 may provide a means for the vehicle to communicate with another device located in the vehicle. For example, the microphone 29 may receive audio (for example, a voice command or other audio input) from the user of the vehicle. Similarly, the speaker 30 may output audio to the user of the vehicle.

The wireless communication system 27 may perform wireless communication with one or more devices directly or by using a communication network. For example, the wireless communication system 27 may use 3G cellular communication, such as CDMA or a GSM/GPRS, or may use 4G cellular communication, such as LTE, or may use 5G cellular communication. The wireless communication system 27 may communicate with a wireless local area network (WLAN) by using Wi-Fi. In some embodiments, the wireless communication system 27 may directly communicate with a device by using an infrared link, Bluetooth, or ZigBee. Other wireless protocols, for example, various vehicle communication systems, such as the wireless communication system 27, may include one or more dedicated short range communication (DSRC) devices, and these devices may include public and/or private data communication between the vehicle and/or roadside stations.

The power supply 24 may supply power to various components of the vehicle. In an embodiment, the power supply 24 may be a rechargeable lithium-ion or lead-acid battery. One or more battery packs of such a battery may be configured as a power supply to supply power to the various components of the vehicle. In some embodiments, the power supply 24 and the energy source 202 may be implemented together, for example, in some all-electric vehicles.

Some or all functions of the vehicle are controlled by the computer system 25. The computer system 25 may include at least one processor 250 and a memory 251. The processor 250 executes instructions stored in the memory 251. The computer system 25 may alternatively be a plurality of computing devices that control individual components or subsystems of the vehicle in a distributed manner.

The processor 250 may be any conventional processor, such as a commercially available CPU or ASIC, or other hardware-based processor-specialized devices.

The memory 251 may be configured to store computer-executable program code, where the executable program code includes instructions. The processor 250 runs the instructions stored in the memory 251, to implement various functions of the vehicle, including those described above. Certainly, the memory 251 may also include one or more pieces of data such as map data and route information in the travel system 20, the sensor system 21, the control system 22, and the peripheral device 23, and may also store instructions in the travel system 20, the sensor system 21, the control system 22, and the peripheral device 23.

The user interface 26 is configured to provide information for or receive information from the user of the vehicle. Optionally, the user interface 26 may include one or more input/output devices within a set of peripheral devices 23, such as the wireless communication system 27, the vehicle-mounted computer 28, the microphone 29, and the speaker 30.

The computer system 25 may control a function of the vehicle based on data received from subsystems (for example, the travel system 20, the sensor system 21, and the control system 22) and the user interface 26. For example, the computer system 25 may control the steering system 220 by using data from the control system 22, to avoid an obstacle detected by the obstacle avoidance system 225.

Optionally, the components shown in FIG. 1B may be coupled in a wired and/or wireless manner. One or more of the components shown in FIG. 1B may be installed separately from the vehicle or may be installed in the vehicle. For example, the memory 251 may be placed in a server outside the vehicle.

Optionally, the structure of the vehicle shown in FIG. 1B is merely an example. In an actual application, the vehicle may include more or fewer components, or combine some components, or have a different component arrangement, in addition to the components shown in FIG. 1B.

The traffic light recognition method provided in the embodiments of this application is described below with reference to the recognition apparatus shown in FIG. 1A and the vehicle shown in FIG. 1B.

Figure 2:
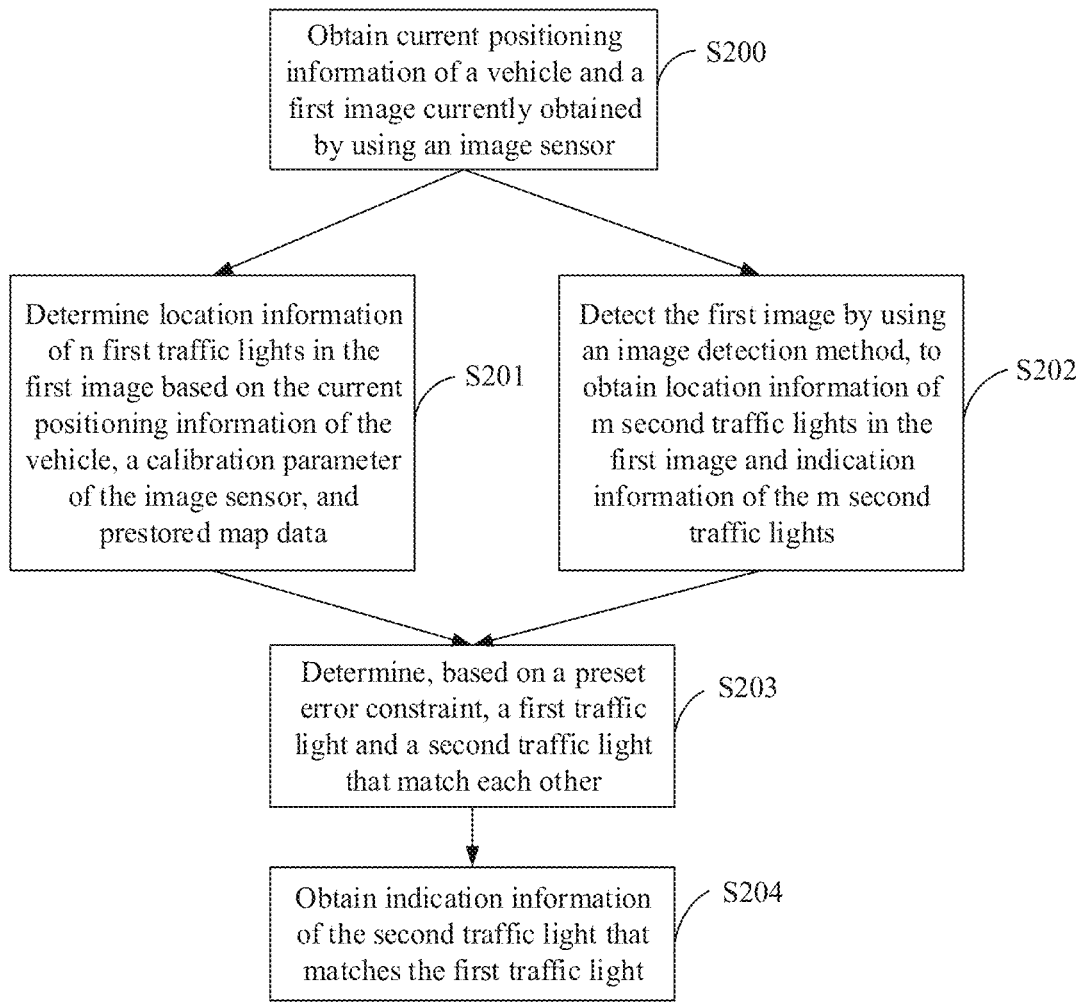
FIG. 2 is a schematic flowchart 1 of a traffic light recognition method according to an embodiment of this application.

FIG. 2 is a schematic flowchart of a traffic light recognition method according to an embodiment of this application. As shown in FIG. 2, the traffic light recognition method in this embodiment of this application includes the following steps.

S200. The recognition apparatus obtains current positioning information of the vehicle and a first image currently obtained by using the image sensor.

In a vehicle running process, the recognition apparatus may obtain positioning information of the vehicle in real time by using the inertial navigation device/lidar, or may obtain positioning information of the vehicle in real time using a satellite positioning technology (for example, a GPS technology), or may obtain positioning information of the vehicle in real time by using any other existing positioning technology. This is not limited in this embodiment of this application.

Herein, the positioning information of the vehicle may include a longitude and latitude, an altitude, posture information (for example, an orientation of a front) of the vehicle, and the like.

The longitude and latitude and the altitude in the positioning information of the vehicle are data in a world coordinate system (which may also be referred to as a geographical coordinate system). The world coordinate system is a coordinate system that indicates a location of a point on an earth surface by using a longitude and a latitude. The coordinate system may be used to describe a location of any object around the vehicle.

Because the recognition apparatus is connected to the image sensor, the recognition apparatus can further obtain the first image (for example, an image shown in FIG. 5) currently obtained by using the image sensor.

To effectively improve traffic light recognition accuracy, time at which the recognition apparatus obtains the positioning information of the vehicle and time at which the image sensor obtains the first image needs to be consistent; otherwise, data does not match at all.

In this embodiment of this application, the "current positioning information of the vehicle" is used to represent positioning information of the vehicle at a current moment, and the "first image currently obtained by the image sensor" is used to represent a first image that is obtained by the image sensor at the current moment.

S201. The recognition apparatus determines location information of n (n is an integer greater than or equal to 1) first traffic lights in the first image based on the current positioning information of the vehicle, a calibration parameter of the image sensor, and prestored map data.

Because the recognition apparatus is connected to the image sensor, the recognition apparatus can obtain and utilize the calibration parameter of the image sensor, such as exposure time or a frame rate.

In this embodiment of this application, the calibration parameter of the image sensor may be an offline calibration parameter, or may be an online calibration parameter. This is not limited in this embodiment of this application.

Specifically, the recognition apparatus determines, based on the current positioning information of the vehicle and the prestored map data, location information of the n first traffic lights in the map data. Then, the recognition apparatus performs coordinate transformation on the location information of the n first traffic lights in the map based on the current positioning information of the vehicle, to obtain location information of the n first traffic lights in a vehicle body coordinate system. Then, the recognition apparatus performs coordinate transformation on the location information of the n first traffic lights in the vehicle body coordinate system based on the calibration parameter of the image sensor, to obtain location information of the n first traffic lights in a camera coordinate system. Finally, the recognition apparatus performs coordinate transformation on the location information of the n first traffic lights in the camera coordinate system, to obtain the location information of the n first traffic lights in the first image (specifically, in an image coordinate system of the first image).

For the vehicle body coordinate system, a corner of the vehicle may be used as an origin of the coordinate system, and directions in which a length, a width, and a height of the vehicle are located are directions of coordinate axes in the coordinate system, respectively.

The camera coordinate system may be a rectangular coordinate system formed by using an intersection point between an optical axis and an image plane as an origin of the coordinate system.

The image coordinate system may be a rectangular coordinate system using an upper left corner of the image as an origin of the coordinate system and using a pixel as a unit.

It can be learned with reference to the foregoing description that after determining the location information of the n first traffic lights in the map data, the recognition apparatus obtains first information through transformation between different coordinate systems (specifically, transformation of the world coordinate system→the vehicle body coordinate system→the camera coordinate system→the image coordinate system).

Generally, transformation between coordinate systems is completed based on a rotation matrix R and a translation matrix T between the two coordinate systems. Both values of the rotation matrix R and the translation matrix T correspond to the coordinate systems to be converted.

For example, a process of "performing coordinate transformation on the location information of the n first traffic lights in the map, to obtain location information of the n first traffic lights in a vehicle body coordinate system" may be multiplying the location information of the n first traffic lights in the map by a rotation matrix R1, and then adding a translation matrix T1, to obtain the location information of the n first traffic lights in the vehicle body coordinate system. Herein, R1 is determined based on the world coordinate system and the vehicle body coordinate system, and T1 is also determined based on the world coordinate system and the vehicle body coordinate system.

Figure 5:
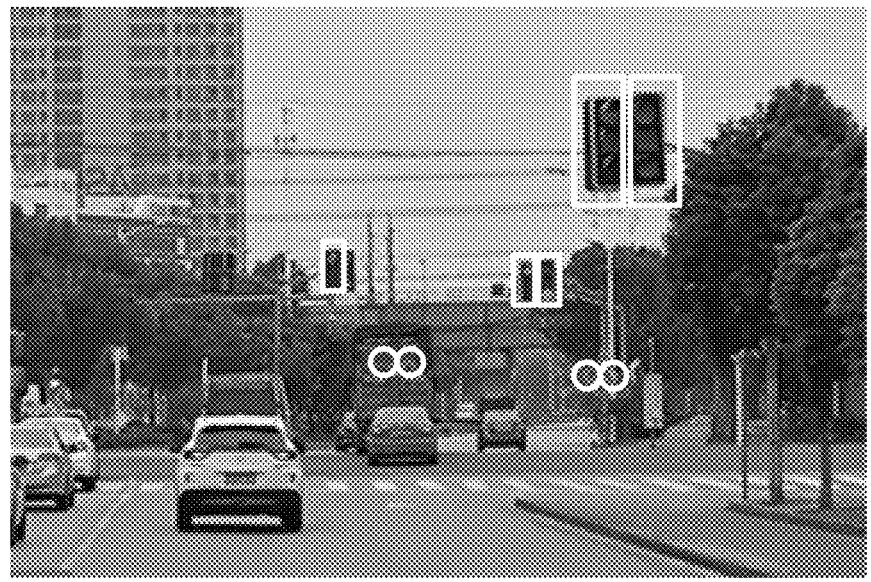
FIG. 5 is a schematic diagram of distribution of first traffic lights and second traffic lights in a first image according to an embodiment of this application.

In an example, the image shown in FIG. 5 is a first image, and the recognition apparatus determines location information of four first traffic lights based on the current positioning information of the vehicle, the calibration parameter of the image sensor, and the prestored map data. In FIG. 5, circles are used to represent the location information of the four first traffic lights.

In this embodiment of this application, the prestored map data may include location information of each traffic light in an actual road scene.

A method for "the recognition apparatus determines, based on the current positioning information of the vehicle and the prestored map data, location information of the n first traffic lights in the map data" may be: The recognition apparatus queries the map data based on the current positioning information of the vehicle, to determine an intersection the vehicle is approaching, and obtain location information of traffic lights (that is, the first traffic lights) that are disposed at the intersection and that are associated with a road on which the vehicle is driving.

Figure 3:
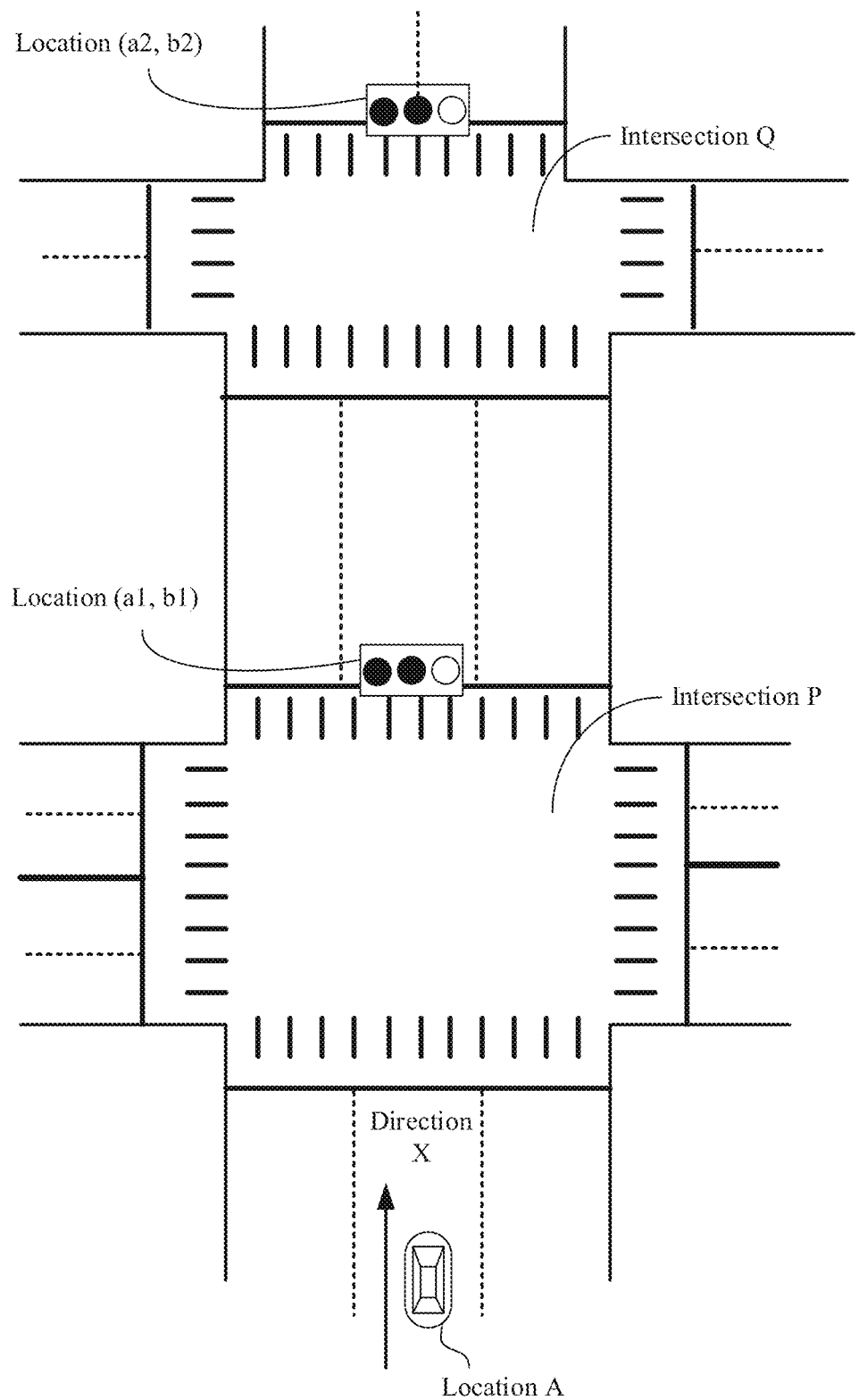
FIG. 3 is a schematic diagram of determining, by a recognition apparatus, location information of a first traffic light in a first image according to an embodiment of this application.

For example, as shown in FIG. 3, if the current positioning information of the vehicle includes a location A, and a posture of the vehicle is in an X direction (that is, the front is oriented to the X direction), the recognition apparatus determines, by querying the map data, that an intersection the vehicle is approaching includes an intersection P and an intersection Q, and obtains, from the map data, location information (a1, b1) of a traffic light that is at the intersection P and that corresponds to the X direction, and location information (a2, b2) of a traffic light that is at the intersection Q and that corresponds to the X direction. It should be noted that the X direction, the location information (a1, b1), and the location information (a2, b2) in the example are merely for illustration. In an actual application, the X direction may be represented by using an azimuth, and both the location information (a1, b1) and the location information (a2, b2) may be represented by using latitudes and longitudes.

S202. The recognition apparatus detects the first image by using an image detection method, to obtain location information of m (m is an integer greater than or equal to 1) second traffic lights in the first image and indication information of the m second traffic lights.

The indication information includes at least one of a color and semantic indication information.

The semantic indication information may include a pointing direction (for example, turn left, go straight, turn right, or turn around), an installation mode (for example, horizontal installation or vertical installation), a light body orientation, and an indication target category (for example, a motor vehicle, a pedestrian, or a non-motor vehicle).

For example, the image shown in FIG. 5 is a first image, and the recognition apparatus detects the first image by using an image detection method, to obtain location information of five second traffic lights in the first image and indication information of the five second traffic lights. In FIG. 5, bounding boxes are used to represent the five second traffic lights.

Optionally, the recognition apparatus may detect the first image by using a neural network model, or may detect the first image by using an object recognition algorithm or another computer vision technology. This is not limited in this embodiment of this application.

Herein, an example in which the recognition apparatus detects the first image by using the neural network model is used for description.

In this embodiment of this application, the neural network model is a deep neural network. The deep neural network has an excellent feature learning capability, and learned features have a more essential characterization of data, to facilitate visualization or classification.

The deep neural network generally includes a plurality of network layers (such as a convolutional layer and a fully-connected layer). A multi-layer structure of the deep neural network can automatically learn features and can learn features of a plurality of layers. A shallower convolutional layer has a smaller receptive domain and learns features of some local regions. A deeper convolutional layer has a larger receptive domain, and can learn more abstract features.

For example, the neural network model in this embodiment of this application may be a convolutional neural network (CNN) model represented by using a ResNet structure, or may be another deep neural network model. This is not limited in this embodiment of this application.

In an example, the neural network model includes a convolution module, a region proposal network (RPN) module, and an information determining module. The convolution module includes a plurality of convolutional layers. A shallower convolutional layer has a smaller receptive domain and can learn features of some local regions (corresponding to small targets (for example, objects from 10 pixels to 90 pixels)). A deeper convolutional layer has a larger receptive domain and can learn more abstract features of a region (corresponding to a large target (for example, an object that includes 96 pixels)). The region proposal network module includes a first RPN and a second RPN. The first RPN is configured to determine a region proposal of a large target, and the second RPN is configured to determine a region proposal of a small target. The information determining module includes a plurality of convolutional layers and fully-connected layers, and is configured to determine location information of a traffic light in an image and indication information of the traffic light.

After obtaining the first image, the recognition apparatus inputs the first image into the neural network model. The recognition apparatus obtains a plurality of feature maps from different layers of the convolution module, and processes the plurality of feature maps by using the RPN module to obtain a first region proposal and a second region proposal. The first region proposal corresponds to a large target in the first image, and the second region proposal corresponds to a small target in the first image. Then, the recognition apparatus processes the first region proposal and the second region proposal by using the information determining module, to determine location information of a traffic light in the first image and indication information of the traffic light.

Figure 4:
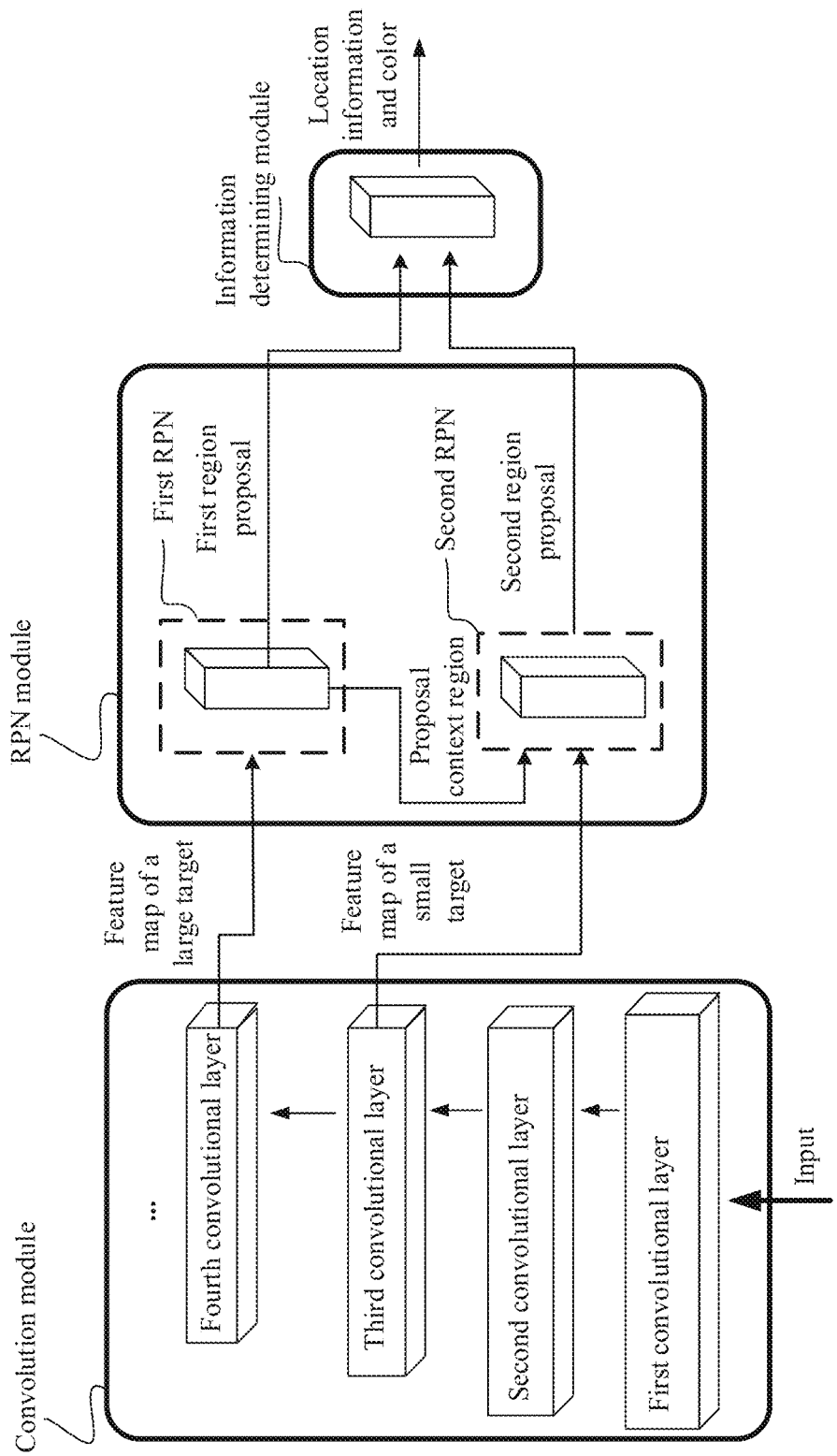
FIG. 4 is a schematic diagram of determining, by a recognition apparatus, location information of a second traffic light in a first image and indication information of the second traffic light according to an embodiment of this application.

For example, the indication information of the traffic light includes a color. FIG. 4 shows a process in which the recognition apparatus detects the first image by using the neural network model to obtain second information. The convolution module in FIG. 4 includes a first convolutional layer, a second convolutional layer, a third convolutional layer, a fourth convolutional layer, and the like. After inputting the first image into the neural network model, the recognition apparatus obtains a feature map of a small target from the third convolutional layer, and obtains a feature map of a large target from the fourth convolutional layer. Then, the feature map of the large target is input into the first RPN to obtain a first region proposal and a proposal context region. The first region proposal is a region including the large target, and the proposal context region is used to assist in determining a region including the small target. The feature map of the small target and the proposal context region are input into the second RPN, to obtain a second region proposal. The second region proposal is a region including the small target. Finally, the recognition apparatus processes the first region proposal and the second region proposal by using the information determining module, to obtain location information (generally, the location information is represented by using a bounding box) of a traffic light in the first image and a color of the traffic light.

Optionally, the recognition apparatus may first perform S201 and then perform S202, or may first perform S202 and then perform S201, or may perform S201 and S202 at the same time. This is not limited in this application.

Generally, a speed at which the recognition apparatus performs S201 to obtain "the location information of the n first traffic lights in the first image" is faster than a speed at which the recognition apparatus performs S202 to obtain "the location information of the m second traffic lights in the first image and the indication information of the m second traffic lights". Therefore, if the recognition apparatus has determined "the location information of the n first traffic lights in the first image" before "the location information of the m second traffic lights in the first image and the indication information of the m second traffic lights" are determined, the recognition apparatus needs to buffer "the location information of the n first traffic lights in the first image", to ensure timestamp synchronization.

S203. The recognition apparatus determines, based on the location information of the n first traffic lights in the first image and the location information of the m second traffic lights in the first image and based on a preset error constraint, a first traffic light and a second traffic light that match each other.

Specifically, after determining the location information of the n first traffic lights in the first image and the location information of the m second traffic lights in the first image, the recognition apparatus performs step A, step B, and step C, to determine whether a pair of subimages matching each other exists in a first subimage group and a second subimage group. The pair of subimages matching each other meets the preset error constraint.

Step A is: The recognition apparatus selects i first traffic lights from then first traffic lights, and generates the first subimage group, where the first subimage group includes k subimages, each subimage in the first subimage group includes a first location or a first location relationship, the first location is used to indicate locations, in the first image, of the i first traffic lights included in the subimage, the first location relationship is used to indicate a relationship between the locations, in the first image, of the i first traffic lights included in the subimage, $k=C_n^i$, and $1 \leq i \leq \min(n, m)$. Step B is: The recognition apparatus selects i second traffic lights from the m second traffic lights, and generates the second subimage group, where the second subimage group includes p subimages, each subimage in the second subimage group includes a second location or a second location relationship, the second location is used to indicate locations, in the first image, of the i second traffic lights included in the subimage, the second location relationship is used to indicate a relationship between the locations, in the first image, of the i second traffic lights included in the subimage, and $p=C_m^i$. Step C is: The recognition apparatus determines whether a pair of subimages matching each other exists in the first subimage group and the second subimage group. That the pair of subimages matching each other meets the preset error constraint may be reflected as follows: An error between a first location and a second location respectively included in the pair of subimages matching each other is less than the preset error constraint, or an error between a first location relationship and a second location relationship respectively included in the pair of subimages matching each other is less than the preset error constraint.

In this embodiment of this application, the subimage is used to indicate a location, in the first image, of a traffic light included in the subimage, or used to indicate a relationship between locations, in the first image, of traffic lights included in the subimage.

Specifically, if the subimage includes only one traffic light, the subimage is used to indicate a location of the traffic light in the first image. If the subimage includes a plurality of traffic lights, the subimage may be used to indicate a location of each of the plurality of traffic lights in the first image, or may be used to indicate a relationship between the locations of the plurality of traffic lights in the first image.

It can be learned from the above that both the first subimage group and the second subimage group include one or more subimages. Because both the first subimage group and the second subimage group include one or more subimages, at least one pair of subimages matching each other exists.

In this embodiment of this application, the pair of subimages matching each other includes a subimage in the first subimage group and a subimage in the second subimage group that match each other.

If at least two pairs of subimages matching each other exist in the first subimage group and the second subimage group, the recognition apparatus selects a pair of subimages matching each other from the at least two pairs of subimages matching each other, and determines, based on the selected pair of subimages, the first traffic light and the second traffic light that match each other.

If only one pair of subimages matching each other exists in the first subimage group and the second subimage group, the recognition apparatus determines, based on the pair of subimages matching each other, the first traffic light and the second traffic light that match each other.

In addition, if no pair of subimages matching each other exists in the first subimage group and the second subimage group, the recognition apparatus re-determines a value of i, and performs the foregoing step A, step B, and step C based on the re-determined value of i, until a pair of subimages matching each other exists.

It can be learned that the process in which the recognition apparatus determines a pair of subimages matching each other is a cyclic iterative process.

Optionally, the recognition apparatus may randomly determine the value of i, or may determine the value of i in descending order starting from min(n, m). This is not limited in this embodiment of this application.

For example, the recognition apparatus determines that the value of i is min(n, m) for the first time. If the recognition apparatus determines that no pair of subimages matching each other exists in the first subimage group and the second subimage group after step A, step B, and step C are performed for the first time, the recognition apparatus re-determines that the value of i is min(n, m)−1.

Figure 6:
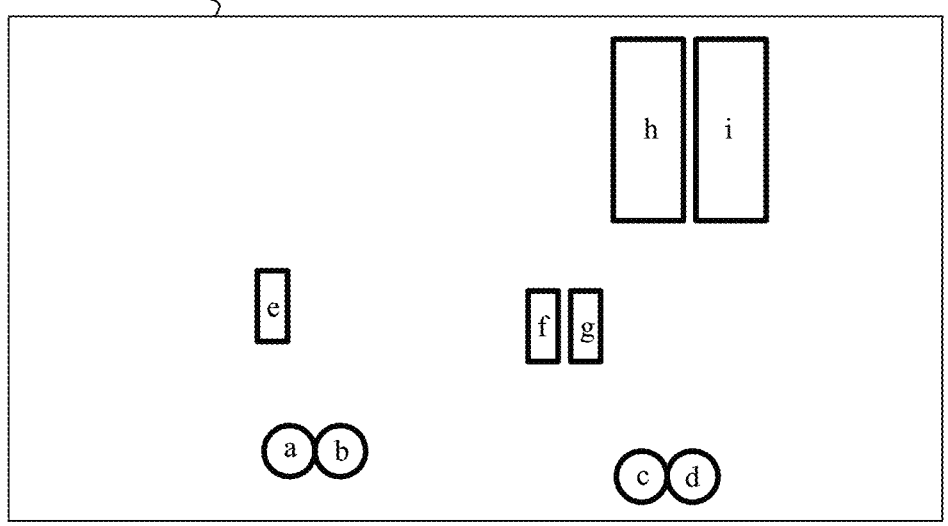
FIG. 6 is a schematic diagram of distribution of the first traffic lights and the second traffic lights in FIG. 5.
Figure 7:
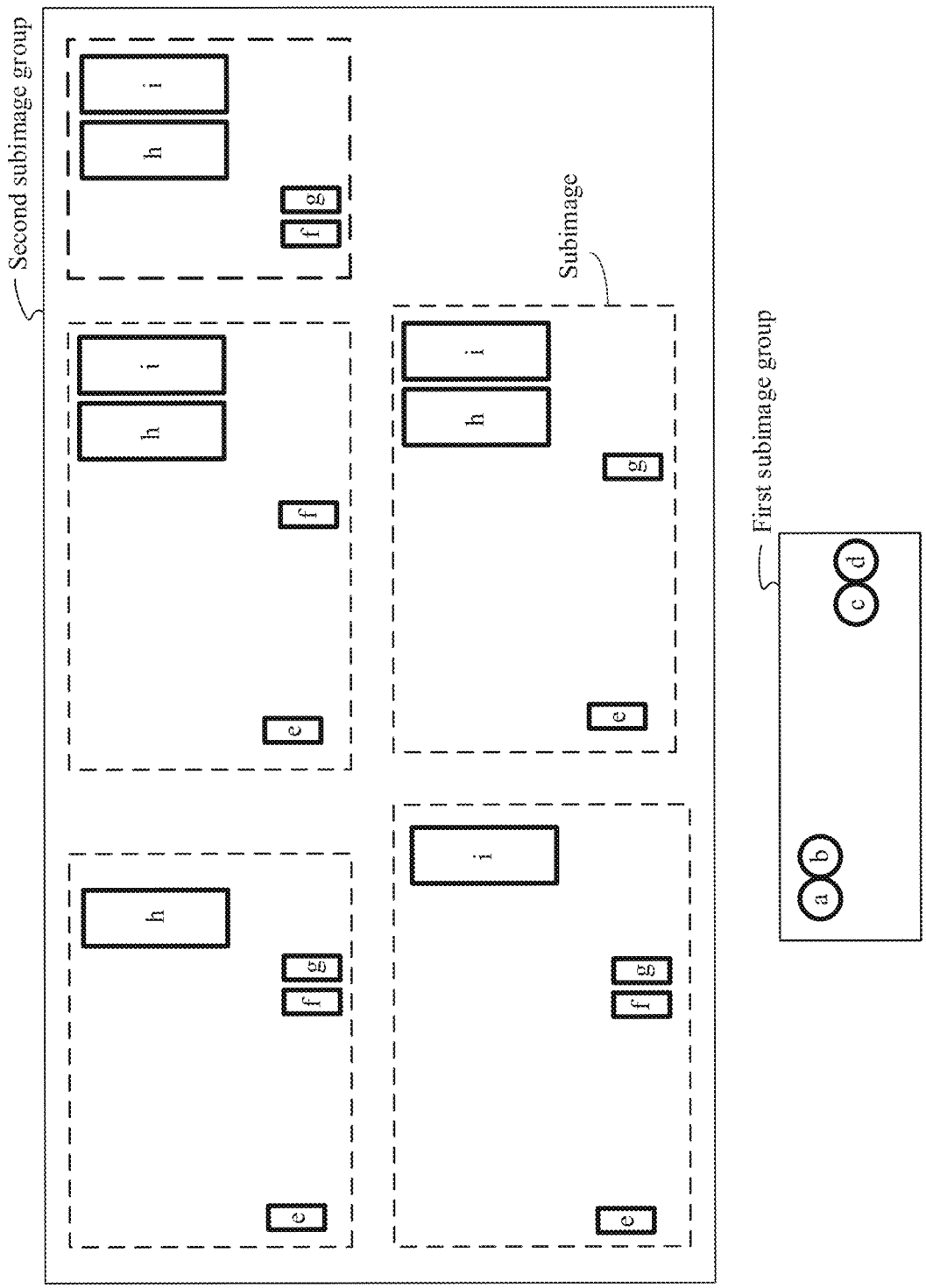
FIG. 7 is a schematic diagram of a first subimage group and a second subimage group according to an embodiment of this application.

To understand the solution more clearly, a process in which the recognition apparatus determines a subimage group is described herein with reference to FIG. 5, FIG. 6, and FIG. 7.

For ease of understanding, in FIG. 6, "the location information of the n first traffic lights in the first image" and "the location information of the m second traffic lights in the first image" in FIG. 5 are represented by using English letters. As shown in FIG. 6, circles are used to represent the location information of the four first traffic lights (a, b, c, and d) in the first image, and bounding boxes are used to represent the location information of the five second traffic lights (e, f, g, h, and i) in the first image. If i=4, the recognition apparatus selects four traffic lights from those represented by the circles and those represented by the bounding boxes, respectively, and combines them to obtain a first subimage group and a second subimage group. The first subimage group includes one subimage, and the second subimage group includes five subimages. FIG. 7 shows the first subimage group and the second subimage groups, each of which includes four traffic lights. Next, the recognition apparatus determines whether a pair of subimages matching each other exists in the first subimage group and the second subimage group. If the recognition apparatus determines that no pair of subimages matching each other exists in the first subimage group and the second subimage group, the recognition apparatus re-determines i to be 3, and regenerates a first subimage group and a second subimage group.

A method for "the recognition apparatus determines whether a pair of subimages matching each other exists in the first subimage group and the second subimage group" is described herein.

An error between a first location and a second location respectively included in the pair of subimages matching each other is less than the preset error constraint, or an error between a first location relationship and a second location relationship respectively included in the pair of subimages matching each other is less than the preset error constraint. The error constraint is a geometric error (refer to the following description) and a distance error (refer to the following description).

Specifically, the recognition apparatus calculates a geometric error and a distance error between a third subimage and a fourth subimage. The geometric error includes at least one of a scale error and an angle error.

The scale error is used to represent a ratio of a first length to a second length, the first length is a length between a $j^{th}$ traffic light and a $(j+1)^{th}$ traffic light that are arranged in the preset order in the third subimage, and the second length is a length between a $j^{th}$ traffic light and a $(j+1)^{th}$ traffic light that are arranged in the preset order in the fourth subimage.

The angle error is used to represent a difference between a first angle and a second angle, the first angle is an angle between a first connection line and a preset coordinate axis in a coordinate system of the first image, the second angle is an angle between a second connection line and the preset coordinate axis in the coordinate system of the first image, the first connection line is a connection line between the $j^{th}$ traffic light and the $(j+1)^{th}$ traffic light that are arranged in the preset order in the third subimage, and the second connection line is a connection line between the $j^{th}$ traffic light and the $(j+1)^{th}$ traffic light that are arranged in the preset order in the fourth subimage, where $j \in [1, i]$.

The preset order may be a spatial left-to-right order, or may be a spatial top-to-bottom order. This is not limited in this embodiment of this application.

For ease of description, this application is mainly described by using an example in which the preset order is the spatial left-to-right order.

The preset coordinate axis may be any coordinate axis in the coordinate system (that is, the image coordinate system) of the first image. This is not limited in this embodiment of this application.

Optionally, when calculating the scale error, the recognition apparatus may directly use the ratio of the first length to the second length as the scale error, or may calculate a plurality of ratios, perform weighted summation on the plurality of calculated ratios, and use a weighted sum as the scale error. This is not limited in this embodiment of this application.

For example, the recognition apparatus calculates the scale error scale_error by using the following formula:

$$\text{scale\_error} = \left( \sum_{j=0}^{x-1} \text{abs}\left(1 - \frac{l_d}{l_m}\right) \right) / (x-1)$$

In the formula, $l_m$ represents the first length, $l_d$ represents the second length, abs( ) represents an absolute value, and x is a quantity of currently selected traffic lights, that is, a quantity of traffic lights included in a subimage.

It is easy to understand that, if a quantity of currently selected traffic lights is x, each subimage includes x traffic lights. A length between each two adjacent traffic lights is calculated in the spatial left-to-right order, and x−1 lengths can be obtained. Because the calibration parameter of the image sensor is relatively accurate, a ratio of corresponding lengths in the two subimages is approximately 1. In this case, a value of scale_error needs to be approximately 0.

Optionally, when calculating the angle error, the recognition apparatus may directly use the difference between the first angle and the second angle as the angle error, or may calculate a plurality of differences, perform weighted summation on the plurality of calculated differences, and use a weighted sum as the angle error. This is not limited in this embodiment of this application.

For example, the recognition apparatus calculates the angle error angle_error by using the following formula:

$$\text{angle\_error} = (\Sigma_{j=0}^{x-1} \text{abs}(\alpha_d - \alpha_m)/(x-1)/A$$

In the formula, $\alpha_m$ represents the first angle, $\alpha_d$ represents the second angle, abs( ) represents an absolute value, A is an empirical threshold, and a value of A is related to an attitude angle of the vehicle and an attitude angle of the image sensor.

In a process of determining the location information of the n first traffic lights in the first image (specifically, in a coordinate system transformation process), the attitude angle of the vehicle and the attitude angle of the image sensor have relatively small impact on a deviation of data. Therefore, an angle deviation between corresponding connection lines between traffic lights in the third subimage and the fourth subimage is approximately 0. In this case, a value of angle_error also needs to be approximately 0.

The distance error is used to indicate a distance between the $j^{th}$ traffic light arranged in the preset order in the third subimage and the $j^{th}$ traffic light arranged in the preset order in the fourth subimage.

For example, the recognition apparatus calculates the distance error dis_error by using the following formula:

$$\text{dis\_error} = (\Sigma_{j=0}^{x}(d/D))/x$$

In the formula, d represents the distance between the $j^{th}$ traffic light arranged in the preset order in the third subimage and the $j^{th}$ traffic light arranged in the preset order in the fourth subimage, D is an empirical coefficient, and a value of D is usually a length of a long side of the image.

Optionally, the geometric error may further include a semantic error. The semantic error is used to indicate confidence of semantic information of the $j^{th}$ traffic light arranged in the preset order in the fourth subimage relative to semantic information of the $j^{th}$ traffic light arranged in the preset order in the third subimage.

For example, the recognition apparatus calculates a shape error shape_error by using the following formula:

$$\text{shape\_error} = \Sigma_{j=0}^{x}(p)/x$$

p=0, $S_d$==$S_m$
p=prob, $S_d$!=$S_m$

In the formula, prob represents confidence of semantic information, $S_d$ is the semantic information of the $j^{th}$ traffic light arranged in the preset order in the fourth subimage, and $S_m$ is the semantic information of the $j^{th}$ traffic light arranged in the preset order in the third subimage. If the semantic information of the $j^{th}$ traffic light arranged in the preset order in the fourth subimage is inconsistent with the semantic information of the $j^{th}$ traffic light arranged in the preset order in the third subimage, the recognition apparatus uses the semantic information of the $j^{th}$ traffic light arranged in the preset order in the fourth subimage.

Figure 8:
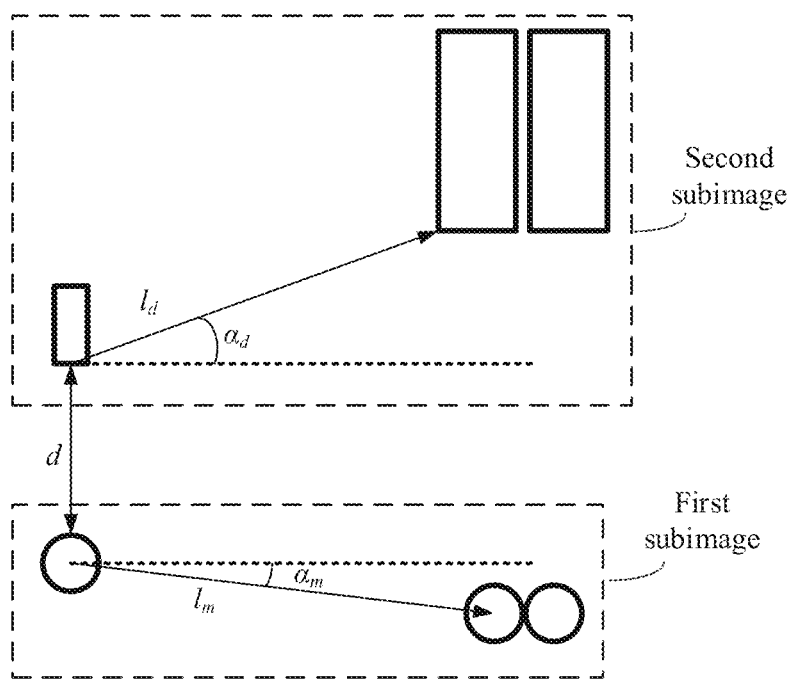
FIG. 8 is a principle diagram of determining, by a recognition apparatus, a geometric error and a distance error according to an embodiment of this application.

FIG. 8 shows examples of $l_m$, $l_d$, $\alpha_m$, $\alpha_d$, and d.

After calculating the geometric error and the distance error, the recognition apparatus determines whether the geometric error meets a preset condition and whether the distance error is less than a preset distance. If the geometric error meets the preset condition and the distance error is less than the preset distance, the third subimage and the fourth subimage match each other.

For example, if the geometric error includes the scale error, the preset condition includes: the scale error is less than or equal to a first preset threshold. If the geometric error includes the angle error, the preset condition includes: the angle error is less than or equal to a second preset threshold.

It can be learned with reference to the foregoing description that a quantity of pairs of subimages matching each other in the first subimage group and the second subimage group is one or at least two.

If only one pair of subimages matching each other exists in the first subimage group and the second subimage group, the recognition apparatus directly determines traffic lights in the pair of subimages as the first traffic light and the second traffic light that match each other.

If at least two pairs of subimages matching each other exist in the first subimage group and the second subimage group, the recognition apparatus may determine, in either of the following manners, the first traffic light and the second traffic light that match each other.

In a first manner, the recognition apparatus randomly selects one pair from the pairs of subimages matching each other, and determines traffic lights included in the selected pair of subimages as the first traffic light and the second traffic light that match each other.

In a second manner, the recognition apparatus determines that traffic lights included in a pair of subimages with a minimum sum of a geometric error and a distance error in the at least two pairs of subimages matching each other as the first traffic light and the second traffic light that match each other.

The first traffic light and the second traffic light that match each other are more accurately determined in the second manner.

Certainly, the recognition apparatus may alternatively determine, in another manner, the first traffic light and the second traffic light that match each other. This is not limited in this embodiment of this application.

It is easy to understand that because the quantity of traffic lights in the subimage is i, and 1≤i≤min(n, m), after a first subimage and a second subimage that match each other are determined, an $i^{th}$ first traffic lights in the first subimage and an $i^{th}$ second traffic lights in the second subimage match each other.

It is assumed that the recognition apparatus determines that a first subimage in the first subimage group and a second subimage in the second subimage group match each other. After determining that the first subimage and the second subimage match each other, the recognition apparatus determines that a $j^{th}$ first traffic light arranged in the preset order in the first subimage matches a $j^{th}$ second traffic light arranged in the preset order in the second subimage, where $j \in [1, i]$.

The preset order may be a spatial left-to-right order, or may be a spatial top-to-bottom order, or may be a spatial right-to-left order. This is not limited in this embodiment of this application.

S204. The recognition apparatus obtains indication information of the second traffic light that matches the first traffic light.

The indication information of the second traffic light is obtained by the recognition apparatus by detecting the first image, and may include at least one of a color or semantic information. After determining the second traffic light that matches the first traffic light, the recognition apparatus may directly obtain the indication information of the second traffic light that matches the first traffic light.

If a quantity of pairs of first traffic lights and second traffic lights that match each other and that are determined in S203 is i, the recognition apparatus obtains indication information of all second traffic lights in the i pairs of first traffic lights and second traffic lights that match each other.

Optionally, after obtaining the indication information of the second traffic light that matches the first traffic light, the recognition apparatus sends the indication information to the computer system in the vehicle, so that the computer system of the vehicle controls running of the vehicle based on the indication information.

In conclusion, in a traffic light recognition process, the recognition apparatus comprehensively considers an image detection result and a map positioning result under a condition of the preset error constraint, thereby effectively preventing a traffic light from being mistakenly detected or missed, reducing a matching error, and improving traffic light recognition accuracy.

Figure 9:
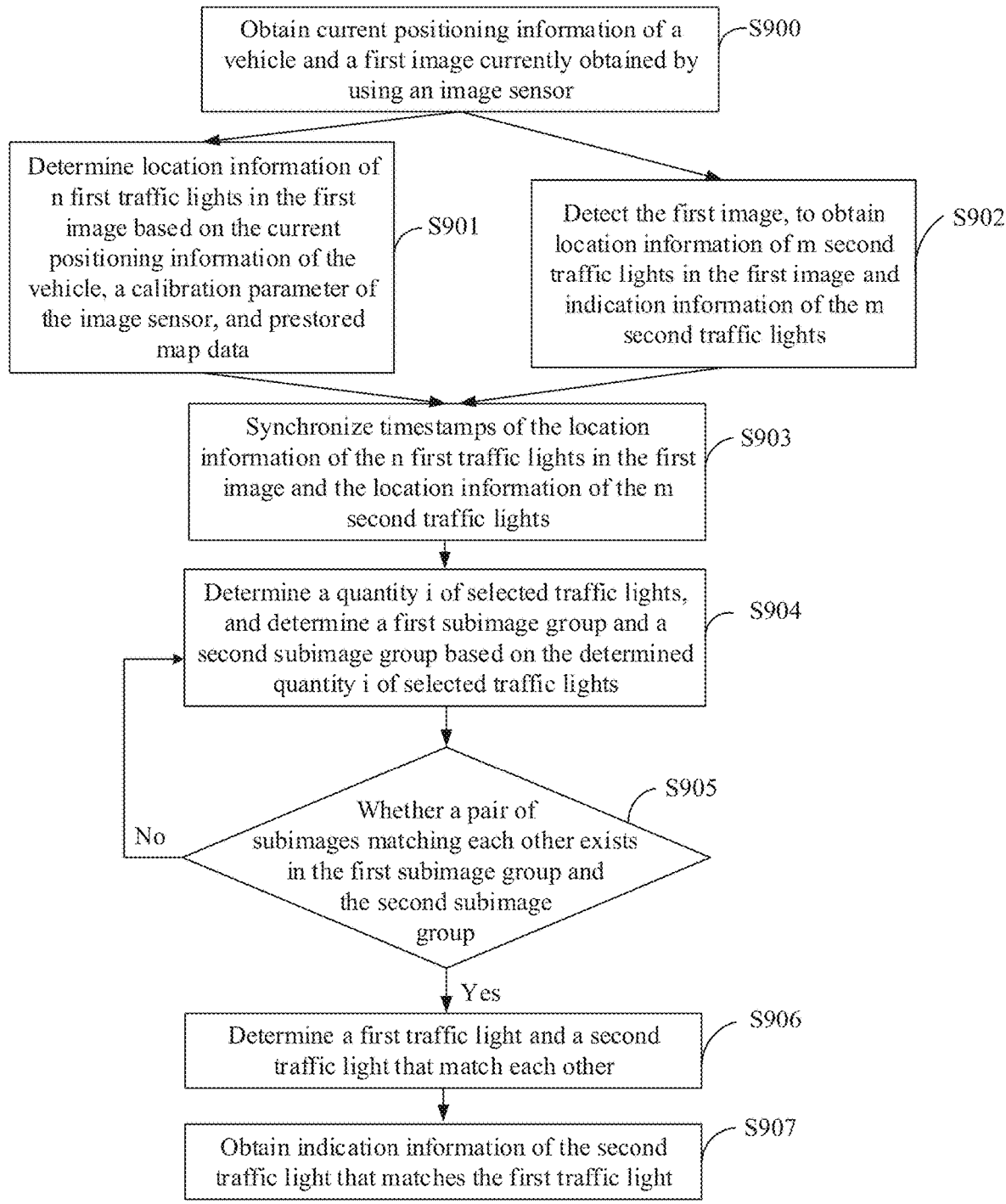
FIG. 9 is a schematic flowchart 2 of a traffic light recognition method according to an embodiment of this application.

FIG. 9 is another schematic flowchart of a traffic light recognition method according to an embodiment of this application. As shown in FIG. 9, the traffic light recognition method in this embodiment of this application includes the following steps.

S900. The recognition apparatus obtains current positioning information of the vehicle and a first image currently obtained by using the image sensor.

For S900, refer to the foregoing description of S200. Details are not described herein again.

S901. The recognition apparatus determines location information of n first traffic lights in the first image based on the current positioning information of the vehicle, a calibration parameter of the image sensor, and prestored map data.

For S901, refer to the foregoing description of S201. Details are not described herein again.

S902. The recognition apparatus detects the first image by using an image detection method, to obtain location information of m second traffic lights in the first image and indication information of the m second traffic lights.

For S902, refer to the foregoing description of S202. Details are not described herein again.

S903. The recognition apparatus synchronizes timestamps of the location information of the n first traffic lights in the first image and the location information of the m second traffic lights.

S904. The recognition apparatus determines a quantity i of selected traffic lights, and determines a first subimage group and a second subimage group based on the determined quantity i of selected traffic lights.

For S904, refer to the description of determining a subimage group by the recognition apparatus in S203. Details are not described herein again.

S905. The recognition apparatus determines whether a pair of subimages matching each other exists in the first subimage group and the second subimage group.

For S905, refer to the description of determining, by the recognition apparatus, whether a pair of subimages matching each other exists in the first subimage group and the second subimage group in S203. Details are not described herein again.

S906. If a pair of subimages matching each other exists in the first subimage group and the second subimage group, the recognition apparatus determines a first traffic light and a second traffic light that match each other.

S907. The recognition apparatus obtains indication information of the recognition apparatus obtains indication information of the traffic light that matches the first traffic light.

If no pair of subimages matching each other exists in the first subimage group and the second subimage group, the recognition apparatus re-determines a quantity of selected traffic lights, and determines a first subimage group and a second subimage group based on the determined quantity of selected traffic lights, that is, re-perform S904.

Compared with the conventional technologies, the traffic light recognition method provided in this embodiment of this application effectively prevents a traffic light from being mistakenly detected or missed, reduces a matching error, and improves traffic light recognition accuracy.

The foregoing mainly describes the solutions provided in the embodiments of this application from a perspective of the methods. To implement the foregoing functions, the solutions provided in the embodiments of this application include corresponding hardware structures and/or software modules for performing the functions. A person skilled in the art should easily be aware that, in combination with units and algorithm steps of the examples described in the embodiments disclosed in this specification, this application may be implemented by hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In this embodiment of this application, the traffic light recognition apparatus may be divided into functional modules based on the foregoing method example. For example, each functional module may be obtained through division based on each corresponding function, or two or more functions may be integrated into one processing module. The integrated module may be implemented in a form of hardware, or may be implemented in a form of a software functional module. It should be noted that, in the embodiments of this application, division into the modules is an example, and is merely logical function division. In an actual implementation, another division manner may be used.

Figure 10:
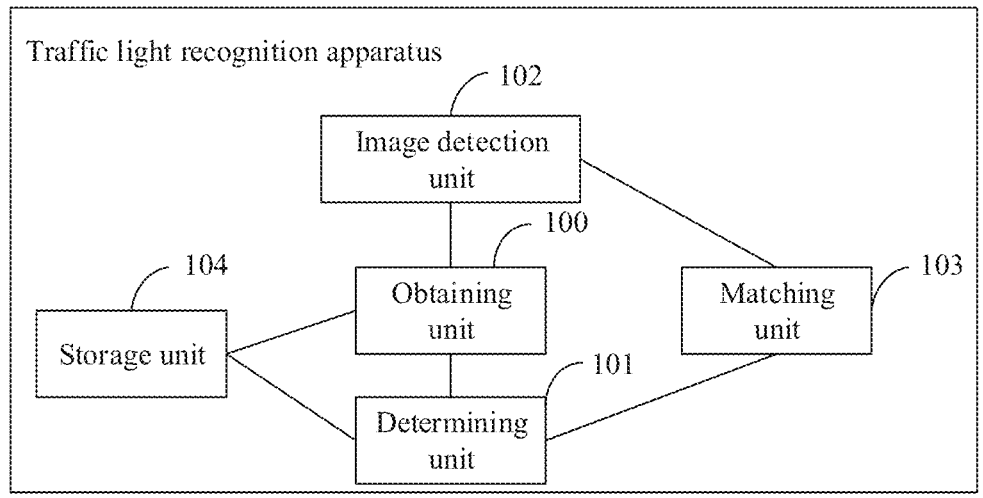
FIG. 10 is a schematic diagram of a structure of a traffic light recognition apparatus according to an embodiment of this application.

FIG. 10 is a schematic diagram of a structure of a traffic light recognition apparatus according to an embodiment of this application. The traffic light recognition apparatus is configured to recognize a traffic light and obtain indication information of the traffic light, for example, configured to perform the method shown in FIG. 2 and/or FIG. 9. The traffic light recognition apparatus may include an obtaining unit 100, a determining unit 101, an image detection unit 102, a matching unit 103, and a storage unit 104.

The obtaining unit 100 is configured to obtain current positioning information of a vehicle and a first image. The determining unit 101 is configured to determine location information of n first traffic lights in the first image based on the current positioning information, obtained by the obtaining unit 100, of the vehicle, a calibration parameter of the image sensor, and map data prestored by the storage unit 104. The image detection unit 102 is configured to detect, by using an image detection method, the first image obtained by the obtaining unit 100, to obtain location information of m second traffic lights in the first image and indication information of the m second traffic lights. The matching unit 103 is configured to determine, based on the location information, determined by the determining unit, of the n first traffic lights in the first image and the location information, obtained by the image detection unit, of the m second traffic lights in the first image and based on a preset error constraint, a first traffic light and a second traffic light that match each other. The obtaining unit 100 is further configured to obtain indication information of the second traffic light that is determined by the matching unit 103 and that matches the first traffic light.

For example, with reference to FIG. 2, the obtaining unit 100 may be configured to perform S200, the determining unit 101 may be configured to perform S201, the image detection unit 102 may be configured to perform S202, the matching unit 103 may be configured to perform S203, and the storage unit 104 is configured to store map data.

Optionally, the matching unit 103 is specifically configured to: step A: select i first traffic lights from the n first traffic lights, and generate a first subimage group, where the first subimage group includes k subimages, each subimage in the first subimage group includes a first location or a first location relationship, the first location is used to indicate locations, in the first image, of the i first traffic lights included in the subimage, the first location relationship is used to indicate a relationship between the locations, in the first image, of the i first traffic lights included in the subimage, $k=C_n^i$, and $1 \leq i \leq \min(n, m)$; step B: select i second traffic lights from the m second traffic lights, and generate a second subimage group, where the second subimage group includes p subimages, each subimage in the second subimage group includes a second location or a second location relationship, the second location is used to indicate locations, in the first image, of the i second traffic lights included in the subimage, the second location relationship is used to indicate a relationship between the locations, in the first image, of the i second traffic lights included in the subimage, and $p=C_m^i$; step C: determine whether a pair of subimages matching each other exists in the first subimage group and the second subimage group, where an error between a first location and a second location respectively included in the pair of subimages matching each other is less than the preset error constraint, or an error between a first location relationship and a second location relationship respectively included in the pair of subimages matching each other is less than the preset error constraint; and if a pair of subimages matching each other exists, determine, based on the pair of subimages matching each other, the first traffic light and the second traffic light that match each other.

For example, with reference to FIG. 9, the matching unit 103 may be configured to perform S904, S905, and S906.

Optionally, in another possible implementation of this application, the matching unit 103 is specifically configured to: select, if at least two pairs of subimages matching each other exist, a pair of subimages matching each other from the at least two pairs of subimages matching each other, where the selected pair of subimages matching each other respectively include a first subimage in the first subimage group and a second subimage in the second subimage group; and determine that a $j^{th}$ first traffic light arranged in a preset order in the first subimage matches a $j^{th}$ second traffic light arranged in the preset order in the second subimage; and if only one pair of subimages matching each other exists, and the pair of subimages matching each other respectively include a first subimage in the first subimage group and a second subimage in the second subimage group, determine that a $j^{th}$ first traffic light arranged in a preset order in the first subimage matches a $j^{th}$ second traffic light arranged in the preset order in the second subimage, where $j \in [1, i]$.

Optionally, in another possible implementation of this application, the determining unit 101 is further configured to: if the matching unit 103 determines that no pair of subimages matching each other exists, re-determine a value of i. The matching unit 103 is further configured to perform step A, step B, and step C based on the value, re-determined by the determining unit, of i.

Optionally, in another possible implementation of this application, the error constraint is a geometric error and a distance error. Correspondingly, the matching unit 103 is specifically configured to: calculate a geometric error and a distance error between a third subimage and a fourth subimage, where the third subimage is any subimage in the first subimage group, and the fourth subimage is any subimage in the second subimage group; and if the geometric error meets a preset condition and the distance error is less than a preset distance, determine that the third subimage and the fourth subimage match each other.

The scale error is used to represent a ratio of a first length to a second length, the first length is a length between a $j^{th}$ traffic light and a $(j+1)^{th}$ traffic light that are arranged in the preset order in the third subimage, and the second length is a length between a $j^{th}$ traffic light and a $(j+1)^{th}$ traffic light that are arranged in the preset order in the fourth subimage. The angle error is used to represent a difference between a first angle and a second angle, the first angle is an angle between a first connection line and a preset coordinate axis in a coordinate system of the first image, the second angle is an angle between a second connection line and the preset coordinate axis, the first connection line is a connection line between the $j^{th}$ traffic light and the $(j+1)^{th}$ traffic light that are arranged in the preset order in the third subimage, and the second connection line is a connection line between the $j^{th}$ traffic light and the $(j+1)^{th}$ traffic light that are arranged in the preset order in the fourth subimage, where $j \in [1, i]$. The distance error is used to indicate a distance between the $j^{th}$ traffic light arranged in the preset order in the third subimage and the $j^{th}$ traffic light arranged in the preset order in the fourth subimage. That the geometric error meets a preset condition includes: if the geometric error includes the scale error, the scale error is less than or equal to a first preset threshold; and if the geometric error includes the angle error, the angle error is less than or equal to a second preset threshold.

Optionally, in another possible implementation of this application, the geometric error further includes a semantic error. The semantic error is used to indicate confidence of semantic information of the $j^{th}$ traffic light arranged in the preset order in the fourth subimage relative to semantic information of the $j^{th}$ traffic light arranged in the preset order in the third subimage. That the geometric error meets a preset condition further includes: the semantic error is less than or equal to a third preset threshold.

Optionally, in another possible implementation of this application, the matching unit 103 is specifically configured to: if the at least two pairs of subimages matching each other exist, select, from the at least two pairs of subimages matching each other, a pair of subimages having a minimum sum of a geometric error and a distance error.

Optionally, in another possible implementation of this application, the image detection unit 102 is specifically configured to detect the first image by using a preset neural network model, to obtain the location information of the m second traffic lights in the first image and the indication information of the m second traffic lights.

In an example, with reference to FIG. 1A, functions implemented by the obtaining unit 100 in the recognition apparatus are the same as functions of the communication interface 12 in FIG. 1A, functions implemented by the determining unit 101, the image detection unit 102, and the matching unit 103 are the same as functions of the processor 10 in FIG. 1A, and functions implemented by the storage unit 104 are the same as functions of the memory 11 in FIG. 1A.

For description of related content in this embodiment, refer to the foregoing method embodiment. Details are not described herein again.

Another embodiment of this application further provides a computer-readable storage medium. The computer-readable storage medium stores instructions. When the instructions are run on a recognition apparatus, the recognition apparatus performs steps performed by the recognition apparatus in the method process shown in the foregoing method embodiment.

Another embodiment of this application further provides a vehicle. The vehicle includes the foregoing recognition apparatus. After the recognition apparatus obtains indication information of a second traffic light that matches a first traffic light, the vehicle controls running of the vehicle based on the indication information.

In some embodiments, the disclosed method may be implemented as computer program instructions encoded in a machine-readable format on a computer-readable storage medium or encoded on another non-transitory medium or product.

Figure 11:
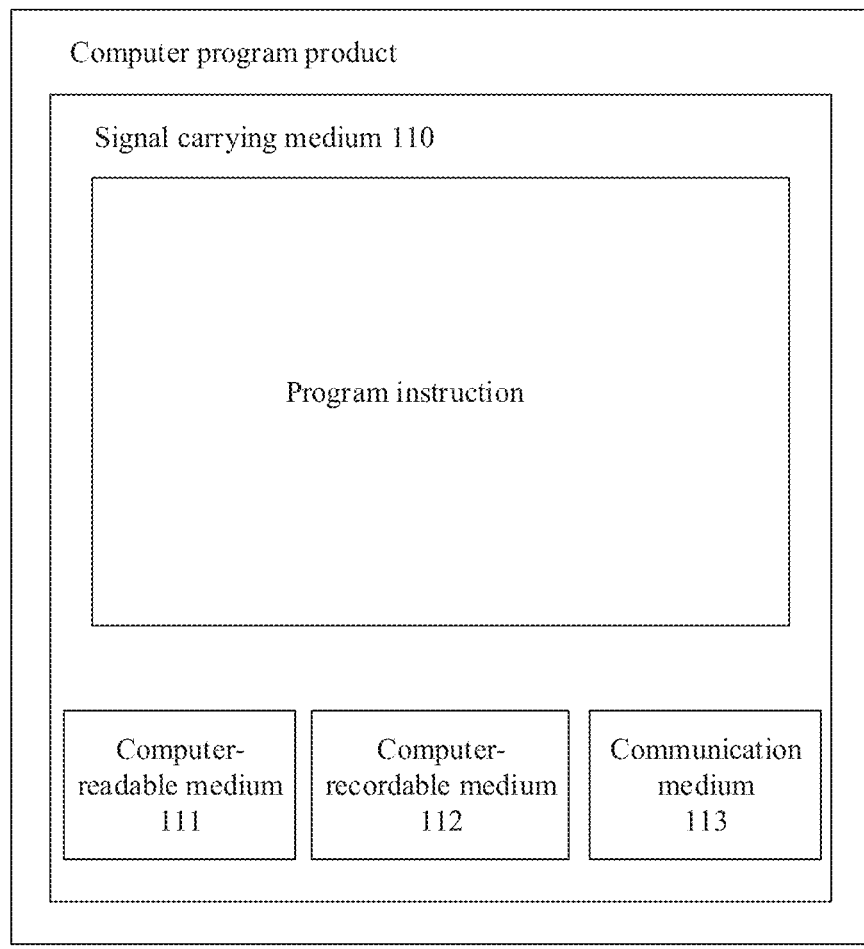
FIG. 11 is a schematic diagram of a structure of a computer program product according to an embodiment of this application.

FIG. 11 schematically shows a conceptual partial view of a computer program product according to an embodiment of this application. The computer program product includes a computer program used to execute a computer process on a computing device.

In an embodiment, the computer program product is provided by using a signal bearer medium 110. The signal bearer medium 110 may include one or more program instructions. When the program instructions are run by one or more processors, the functions or some of the functions described for FIG. 2 or FIG. 9 may be provided. Therefore, for example, refer to the embodiment shown in FIG. 2, one or more features of S201 to S203 may be assumed by one or more instructions associated with the signal bearer medium 110. In addition, the program instructions in FIG. 11 also described as example instructions.

In some examples, the signal bearer medium 110 may include a computer-readable medium 111, for example, but not limited to, a hard disk drive, a compact disc (CD), a digital video disc (DVD), a digital tape, a memory, a read-only memory (ROM), or a random access memory (RAM).

In some implementations, the signal bearer medium 110 may include a computer-recordable medium 112, for example, but not limited to, a memory, a read/write (R/W) CD, or an R/W DVD.

In some implementations, the signal bearer medium 110 may include a communication medium 113, for example, but is not limited to a digital and/or analog communication medium (for example, an optical fiber cable, a waveguide, a wired communication link, or a wireless communication link).

The signal bearer medium 110 may be conveyed by a wireless-form communication medium 113 (for example, a wireless communication medium that complies with the IEEE 802.11 standard or another transmission protocol). The one or more program instructions may be, for example, one or more computer-executable instructions or one or more logic implementation instructions.

In some examples, a recognition apparatus such as that described with respect to FIG. 2 or FIG. 9 may be configured to provide various operations, functions, or actions in response to one or more program instructions in the computer-readable medium 111, the computer-recordable medium 112, and/or the communication medium 113.

It should be understood that the arrangement described herein is merely for purpose of an example. Thus, a person skilled in the art appreciates that another arrangement and another element (for example, a machine, an interface, a function, a sequence, and a group of functions) can be used to replace the arrangement, and some elements may be omitted together depending on a desired result. In addition, many of the described elements are functional entities that can be implemented as discrete or distributed components, or implemented in any suitable combination and at any suitable location in combination with another component.

All or some of the foregoing embodiments may be implemented by using software, hardware, firmware, or any combination thereof. When a software program is used to implement the embodiments, the embodiments may be implemented all or partially in a form of a computer program product. The computer program product includes one or more computer instructions. When the computer-executable instructions are loaded and executed on a computer, the procedure or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, for example, a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

The foregoing descriptions are merely specific implementations of this application. Any variation or replacement readily figured out by a person skilled in the art based on the specific implementations provided in this application shall fall within the protection scope of this application.

What is claimed is:

1. A traffic light recognition method, comprising:
    obtaining current positioning information of a vehicle and a first image, wherein the first image is currently obtained by using an image sensor;
    determining location information of n first traffic lights in the first image based on the current positioning information of the vehicle, a calibration parameter of the image sensor, and prestored map data, wherein n is an integer greater than or equal to 1;
    detecting the first image by using an image detection method, to obtain location information of m second traffic lights in the first image and indication information of the m second traffic lights, wherein the indication information comprises at least one of a color and semantic indication information, and m is an integer greater than or equal to 1;
    determining, based on the location information of the n first traffic lights in the first image and the location information of the m second traffic lights in the first image and based on a preset error constraint, a first traffic light and a second traffic light that match each other; and
    obtaining indication information of the second traffic light that matches the first traffic light.

2. The method according to claim 1, wherein the determining, based on the location information of the n first traffic lights in the first image and the location information of the m second traffic lights in the first image and based on the preset error constraint, the first traffic light and the second traffic light that match each other comprises:
    step A: selecting i first traffic lights from the n first traffic lights, and generating a first subimage group, wherein the first subimage group comprises k subimages, each subimage in the first subimage group comprises a first location or a first location relationship, the first location is used to indicate locations, in the first image, of the i first traffic lights comprised in the subimage, the first location relationship is used to indicate a relationship between the locations, in the first image, of the i first traffic lights comprised in the subimage, and wherein $k=C_n^i$, and $1 \leq i \leq \min(n, m)$;
    step B: selecting i second traffic lights from the m second traffic lights, and generating a second subimage group, wherein the second subimage group comprises p subimages, each subimage in the second subimage group comprises a second location or a second location relationship, the second location is used to indicate locations, in the first image, of the i second traffic lights comprised in the subimage, the second location relationship is used to indicate a relationship between the locations, in the first image, of the i second traffic lights comprised in the subimage, and wherein $p=C_m^i$; and
    step C: determining whether a pair of subimages matching each other exists in the first subimage group and the second subimage group, wherein an error between a first location and a second location respectively comprised in the pair of subimages matching each other is less than the preset error constraint, or an error between a first location relationship and a second location relationship respectively comprised in the pair of subimages matching each other is less than the preset error constraint;
    wherein if a pair of subimages matching each other exists, determining, based on the pair of subimages matching each other, the first traffic light and the second traffic light that match each other.

3. The method according to claim 2, wherein the determining, based on the pair of subimages matching each other, the first traffic light and the second traffic light that match each other comprises:
    selecting, among at least two pairs of subimages matching each other that exist, a pair of subimages matching each other from the at least two pairs of subimages matching each other, wherein the selected pair of subimages matching each other respectively comprises a first subimage in the first subimage group and a second subimage in the second subimage group; and determining that a $j^{th}$ first traffic light arranged in a preset order in the first subimage matches a $j^{th}$ second traffic light arranged in the preset order in the second subimage;

wherein $j \in [1, i]$.

4. The method according to claim 2, wherein the method further comprises:

if no pair of subimages matching each other exists, re-determining a value of i, and performing step A, step B, and step C based on the re-determined value of i.

5. The method according to claim 2, wherein the error constraint is a geometric error and a distance error, and the determining whether a pair of subimages matching each other exists in the first subimage group and the second subimage group comprises:

calculating a geometric error and a distance error between a third subimage and a fourth subimage, wherein the third subimage is any subimage in the first subimage group, and the fourth subimage is any subimage in the second subimage group; and in response to the geometric error meeting a preset condition and the distance error being less than a preset distance, determining that the third subimage and the fourth subimage match each other;

wherein the geometric error comprises at least one of a scale error or an angle error;

wherein the scale error is used to represent a ratio of a first length to a second length, the first length is a length between a $j^{th}$ traffic light and a $(j+1)^{th}$ traffic light that are arranged in the preset order in the third subimage, and the second length is a length between a $j^{th}$ traffic light and a $(j+1)^{th}$ traffic light that are arranged in the preset order in the fourth subimage;

wherein the angle error is used to represent a difference between a first angle and a second angle, the first angle is an angle between a first connection line and a preset coordinate axis in a coordinate system of the first image, the second angle is an angle between a second connection line and the preset coordinate axis, the first connection line is a connection line between the $j^{th}$ traffic light and the $(j+1)^{th}$ traffic light that are arranged in the preset order in the third subimage, and the second connection line is a connection line between the $j^{th}$ traffic light and the $(j+1)^{th}$ traffic light that are arranged in the preset order in the fourth subimage, wherein $j \in [1, i]$;

wherein the distance error is used to indicate a distance between the $j^{th}$ traffic light arranged in the preset order in the third subimage and the $j^{th}$ traffic light arranged in the preset order in the fourth subimage; and wherein the geometric error meeting the preset condition comprises: when the geometric error comprises the scale error, the scale error is less than or equal to a first preset threshold; and when the geometric error comprises the angle error, the angle error is less than or equal to a second preset threshold.

6. The method according to claim 5, wherein the geometric error further comprises a semantic error, and the semantic error is used to indicate confidence of semantic information of the $j^{th}$ traffic light arranged in the preset order in the fourth subimage relative to semantic information of the $j^{th}$ traffic light arranged in the preset order in the third subimage; and wherein the geometric error meeting the preset condition further comprises the semantic error being less than or equal to a third preset threshold.

7. The method according to claim 5, wherein the selecting, among the at least two pairs of subimages matching each other exist, a pair of subimages matching each other from the at least two pairs of subimages matching each other comprises:

selecting, from the at least two pairs of subimages matching each other, a pair of subimages having a minimum sum of a geometric error and a distance error.

8. The method according to claim 2, wherein only one pair of subimages matching each other exists, and the pair of subimages matching each other respectively comprises a first subimage in the first subimage group and a second subimage in the second subimage group, and wherein the determining, based on the pair of subimages matching each other, the first traffic light and the second traffic light that match each other comprises:

determining that a $j^{th}$ first traffic light arranged in a preset order in the first subimage matches a $j^{th}$ second traffic light arranged in the preset order in the second subimage, wherein $j \in [1, i]$.

9. The method according to claim 1, wherein the detecting the first image by using the image detection method, to obtain the location information of the m second traffic lights in the first image and the indication information of the m second traffic lights comprises:

detecting the first image by using a preset neural network model, to obtain the location information of the m second traffic lights in the first image and the indication information of the m second traffic lights.

10. An apparatus, comprising:

one or more processors; and a memory that is coupled to the one or more processors, wherein the memory is configured to store computer program code, the computer program code comprises instructions, and when the one or more processors execute the instructions, the apparatus performs a traffic light recognition method comprising:

obtaining current positioning information of a vehicle and a first image, wherein the first image is currently obtained by using an image sensor;

determining location information of n first traffic lights in the first image based on the current positioning information of the vehicle, a calibration parameter of the image sensor, and prestored map data, wherein n is an integer greater than or equal to 1;

detecting the first image by using an image detection method, to obtain location information of m second traffic lights in the first image and indication information of the m second traffic lights, wherein the indication information comprises at least one of a color and semantic indication information, and m is an integer greater than or equal to 1;

determining, based on the location information of the n first traffic lights in the first image and the location information of the m second traffic lights in the first image and based on a preset error constraint, a first traffic light and a second traffic light that match each other; and obtaining indication information of the second traffic light that matches the first traffic light.

11. The apparatus according to claim 10, wherein the determining, based on the location information of the n first traffic lights in the first image and the location information of the m second traffic lights in the first image and based on the preset error constraint, the first traffic light and the second traffic light that match each other comprises:

step A: selecting i first traffic lights from the n first traffic lights, and generating a first subimage group, wherein the first subimage group comprises k subimages, each subimage in the first subimage group comprises a first location or a first location relationship, the first location is used to indicate locations, in the first image, of the i first traffic lights comprised in the subimage, the first location relationship is used to indicate a relationship between the locations, in the first image, of the i first traffic lights comprised in the subimage, and wherein $k=C_n^i$, and $1 \leq i \leq \min(n, m)$;

step B: selecting i second traffic lights from the m second traffic lights, and generating a second subimage group, wherein the second subimage group comprises p subimages, each subimage in the second subimage group comprises a second location or a second location relationship, the second location is used to indicate locations, in the first image, of the i second traffic lights comprised in the subimage, the second location relationship is used to indicate a relationship between the locations, in the first image, of the i second traffic lights comprised in the subimage, and wherein $p=C_m^i$; and step C: determining whether a pair of subimages matching each other exists in the first subimage group and the second subimage group, wherein an error between a first location and a second location respectively comprised in the pair of subimages matching each other is less than the preset error constraint, or an error between a first location relationship and a second location relationship respectively comprised in the pair of subimages matching each other is less than the preset error constraint;

wherein if a pair of subimages matching each other exists, determining, based on the pair of subimages matching each other, the first traffic light and the second traffic light that match each other.

12. The apparatus according to claim 11, wherein the determining, based on the pair of subimages matching each other, the first traffic light and the second traffic light that match each other comprises:

selecting, among at least two pairs of subimages matching each other that exist, a pair of subimages matching each other from the at least two pairs of subimages matching each other, wherein the selected pair of subimages matching each other respectively comprises a first subimage in the first subimage group and a second subimage in the second subimage group; and determining that a $j^{th}$ first traffic light arranged in a preset order in the first subimage matches a $j^{th}$ second traffic light arranged in the preset order in the second subimage;

wherein $j \in [1, i]$.

13. The apparatus according to claim 11, wherein the method further comprises:

if no pair of subimages matching each other exists, re-determining a value of i, and performing step A, step B, and step C based on the re-determined value of i.

14. The apparatus according to claim 11, wherein the error constraint is a geometric error and a distance error, and the determining whether a pair of subimages matching each other exists in the first subimage group and the second subimage group comprises:

calculating a geometric error and a distance error between a third subimage and a fourth subimage, wherein the third subimage is any subimage in the first subimage group, and the fourth subimage is any subimage in the second subimage group; and in response to the geometric error meeting a preset condition and the distance error being less than a preset distance, determining that the third subimage and the fourth subimage match each other;

wherein the geometric error comprises at least one of a scale error or an angle error;

wherein the scale error is used to represent a ratio of a first length to a second length, the first length is a length between a $j^{th}$ traffic light and a $(j+1)^{th}$ traffic light that are arranged in the preset order in the third subimage, and the second length is a length between a $j^{th}$ traffic light and a $(j+1)^{th}$ traffic light that are arranged in the preset order in the fourth subimage;

wherein the angle error is used to represent a difference between a first angle and a second angle, the first angle is an angle between a first connection line and a preset coordinate axis in a coordinate system of the first image, the second angle is an angle between a second connection line and the preset coordinate axis, the first connection line is a connection line between the $j^{th}$ traffic light and the $(j+1)^{th}$ traffic light that are arranged in the preset order in the third subimage, and the second connection line is a connection line between the $j^{th}$ traffic light and the $(j+1)^{th}$ traffic light that are arranged in the preset order in the fourth subimage, wherein $j \in [1, i]$;

wherein the distance error is used to indicate a distance between the $j^{th}$ traffic light arranged in the preset order in the third subimage and the $j^{th}$ traffic light arranged in the preset order in the fourth subimage; and wherein the geometric error meeting the preset condition comprises: when the geometric error comprises the scale error, the scale error is less than or equal to a first preset threshold; and when the geometric error comprises the angle error, the angle error is less than or equal to a second preset threshold.

15. The apparatus according to claim 14, wherein the geometric error further comprises a semantic error, and the semantic error is used to indicate confidence of semantic information of the $j^{th}$ traffic light arranged in the preset order in the fourth subimage relative to semantic information of the $j^{th}$ traffic light arranged in the preset order in the third subimage; and wherein the geometric error meeting the preset condition further comprises the semantic error being less than or equal to a third preset threshold.

16. The apparatus according to claim 14, wherein the selecting, among the at least two pairs of subimages matching each other exist, a pair of subimages matching each other from the at least two pairs of subimages matching each other comprises:

selecting, from the at least two pairs of subimages matching each other, a pair of subimages having a minimum sum of a geometric error and a distance error.

17. The apparatus according to claim 11, wherein only one pair of subimages matching each other exists, and the pair of subimages matching each other respectively comprises a first subimage in the first subimage group and a second subimage in the second subimage group, and wherein the determining, based on the pair of subimages matching each other, the first traffic light and the second traffic light that match each other comprises:

determining that a $j^{th}$ first traffic light arranged in a preset order in the first subimage matches a $j^{th}$ second traffic light arranged in the preset order in the second subimage, wherein $j \in [1, i]$.

18. The apparatus according to claim 10, wherein the detecting the first image by using the image detection method, to obtain the location information of the m second traffic lights in the first image and the indication information of the m second traffic lights comprises:
  detecting the first image by using a preset neural network model, to obtain the location information of the m second traffic lights in the first image and the indication information of the m second traffic lights.

19. A non-transitory computer-readable storage medium comprising instructions that, run by a processor on a recognition apparatus, the recognition apparatus is enabled to perform a traffic light recognition method comprising:
  obtaining current positioning information of a vehicle and a first image, wherein the first image is currently obtained by using an image sensor;
  determining location information of n first traffic lights in the first image based on the current positioning information of the vehicle, a calibration parameter of the image sensor, and prestored map data, wherein n is an integer greater than or equal to 1;
  detecting the first image by using an image detection method, to obtain location information of m second traffic lights in the first image and indication information of the m second traffic lights, wherein the indication information comprises at least one of a color and semantic indication information, and m is an integer greater than or equal to 1;
  determining, based on the location information of the n first traffic lights in the first image and the location information of the m second traffic lights in the first image and based on a preset error constraint, a first traffic light and a second traffic light that match each other; and
  obtaining indication information of the second traffic light that matches the first traffic light.

* * * * *

UNITED STATES PATENT AND TRADEMARK OFFICE
CERTIFICATE OF CORRECTION

PATENT NO. : 11,915,492 B2
APPLICATION NO. : 17/581472
DATED : February 27, 2024
INVENTOR(S) : Han Xia It is certified that error appears in the above-identified patent and that said Letters Patent is hereby corrected as shown below:

In the Claims

Claim 19: Column 37, Line 10: "Anon-transitory computer-readable storage medium" should read -- A non-transitory computer-readable storage medium --.

Signed and Sealed this
Fourth Day of June, 2024

Katherine Kelly Vidal
Director of the United States Patent and Trademark Office